US010859664B2

(12) United States Patent
Bowden

(10) Patent No.: US 10,859,664 B2
(45) Date of Patent: Dec. 8, 2020

(54) SYSTEMS AND METHODS FOR DIRECTION FINDING USING AUGMENTED SPATIAL SAMPLE COVARIANCE MATRICES

(71) Applicant: Raytheon Company, Waltham, MA (US)

(72) Inventor: James M. Bowden, Forney, TX (US)

(73) Assignee: Raytheon Company, Waltham, MA (US)

( * ) Notice: Subject to any disclaimer, the term of this patent is extended or adjusted under 35 U.S.C. 154(b) by 108 days.

(21) Appl. No.: 16/267,824

(22) Filed: Feb. 5, 2019

(65) Prior Publication Data

US 2019/0170848 A1 Jun. 6, 2019

Related U.S. Application Data

(62) Division of application No. 15/260,715, filed on Sep. 9, 2016, now Pat. No. 10,288,715.

(51) Int. Cl.
| | |
|---|---|
| *G01S 3/04* | (2006.01) |
| *G01S 3/14* | (2006.01) |
| *G01S 3/74* | (2006.01) |
| *G01S 3/48* | (2006.01) |
| *G01S 11/02* | (2010.01) |

(52) U.S. Cl.
CPC ............. *G01S 3/043* (2013.01); *G01S 3/14* (2013.01); *G01S 3/48* (2013.01); *G01S 3/74* (2013.01); *G01S 11/02* (2013.01)

(58) Field of Classification Search
CPC ... G01S 3/043; G01S 3/14; G01S 3/48; G01S 3/74; G01S 11/02
See application file for complete search history.

(56) References Cited

U.S. PATENT DOCUMENTS

| | | | |
|---|---|---|---|
| 5,355,141 A | 10/1994 | Graham et al. | |
| 5,495,256 A | 2/1996 | Piper | |
| 5,768,477 A | 6/1998 | Johnson et al. | |
| (Continued) | | | |

OTHER PUBLICATIONS

Notice of Allowance dated Feb. 3, 2020 for U.S. Appl. No. 16/267,564; 11 Pages.

(Continued)

*Primary Examiner* — Dao L Phan
(74) *Attorney, Agent, or Firm* — Daly, Crowley, Mofford & Durkee LLP

(57) ABSTRACT

A direction finding (DF) system and technique using a switched network architecture to couple a first plurality of antenna elements to a second, fewer, plurality of channels of an RF receiver. The RF receiver provides signals to a DF processor which combines data sampled at phase centers of the plurality of array elements. Such combined data samples may be used to estimate a direction of a received signal. The antenna elements may be configured into subarrays and a switch network couples different groups of subarrays to the RF receiver channels during different dwell times. Data collected during each dwell may be used to generate a spatial sample covariance matrix (SCM) and multiple spatial SCMs may be combined to provide aggregate covariance matrix values. A DF processor uses values from the aggregate covariance matrix to provide an output signal indicative of the direction of a received signal.

17 Claims, 7 Drawing Sheets

(56) References Cited

U.S. PATENT DOCUMENTS

| | | | |
|---|---|---|---|
| 5,892,700 | A | 4/1999 | Haardt |
| 6,075,484 | A * | 6/2000 | Daniel .................. G01S 3/06 |
| | | | 342/372 |
| 6,127,974 | A | 10/2000 | Kesler |
| 6,377,213 | B1 | 4/2002 | Odachi et al. |
| 6,674,410 | B1 | 1/2004 | Davidovitz |
| 6,972,713 | B2 | 12/2005 | Mosher et al. |
| 7,064,710 | B1 | 6/2006 | Ksienski et al. |
| 7,081,851 | B1 | 7/2006 | Lewis |
| 7,233,285 | B2 | 6/2007 | Struckman |
| 7,265,713 | B2 | 9/2007 | Lewis |
| 7,427,953 | B2 | 9/2008 | Chiang et al. |
| 7,705,779 | B2 | 4/2010 | Goldberg et al. |
| 8,660,218 | B2 | 2/2014 | Maleh et al. |
| 9,160,430 | B2 | 10/2015 | Maltsev et al. |
| 9,329,265 | B2 | 5/2016 | Murad et al. |
| 9,389,305 | B2 | 7/2016 | Boufounos |
| 9,502,766 | B2 | 11/2016 | LaPat |
| 9,537,587 | B2 | 1/2017 | Chai et al. |
| 9,654,264 | B2 | 5/2017 | Athley et al. |
| 2007/0222672 | A1 | 9/2007 | Hjelmstad et al. |
| 2007/0285312 | A1 | 12/2007 | Gao et al. |
| 2010/0033377 | A1 | 2/2010 | Straatveit |
| 2013/0120192 | A1 | 5/2013 | Larson |
| 2013/0181861 | A1 | 7/2013 | Zohar et al. |
| 2013/0308717 | A1 | 11/2013 | Maltsev et al. |
| 2014/0240163 | A1 | 8/2014 | Boufounos |
| 2014/0266897 | A1 | 9/2014 | Jakoby et al. |
| 2014/0269389 | A1 | 9/2014 | Bukkfejes et al. |
| 2015/0070217 | A1 | 3/2015 | Sharawi et al. |
| 2015/0234030 | A1 | 8/2015 | Marr et al. |
| 2016/0003931 | A1 | 1/2016 | Ledingham et al. |
| 2018/0074152 | A1 | 3/2018 | Bowden |
| 2018/0128892 | A1 | 5/2018 | Granato |

OTHER PUBLICATIONS

U.S. Appl. No. 15/260,580, filed Sep. 9, 2016, Bowden.
U.S. Appl. No. 16/267,564, filed Feb. 5, 2019, Bowden.
Krim, et al.; "Two Decades of Array Signal Processing Research"; IEEE Signal Processing Magazine; pp. 67-94; Jul. 1996; 28 Pages.
Xu, et al.; "A Subarray-Synthesis Based 2D DOA Estimation Method"; Journal Of Electronics (China); vol. 23; No. 5; pp. 645-649; Sep. 2006; 5 Pages.
PCT Search Report & Written Opinion of the ISA dated Jul. 5, 2017 from International Pat. App. No. PCT/US2017/024015; 17 Pages.
PCT International Search Report and Written Opinion dated Nov. 28, 2017 for International Application No. PCT/US2017/048319; 20 Pages.
Madhow, "Mm-wave Sensing and Communication;" Information-theoretic Structure and Near-optimal Algorithms; USBC PowerPoint Presentation; Jun. 2016; 85 Pages.
Nalobin et al., "Utilization of the Array Factor for Narrowband Direction of Arrival Estimation;" 2015 IEEE International Symposium on Antennas and Propagation & USNC/URSI National Radio Science Meeting; Jul. 19, 2015; 2 Pages.
O'Donnell, "Radar Systems Engineering Lecture 9 Antennas, Part 2—Electronic Scanning and Hybrid Techniques;" PowerPoint—Radar Systems Course 1, Antennas Part 2; IEEE New Hampshire Section Guest Lecturer; Jan. 1, 2010; 70 Pages.
Ramasamy et al., "Compressive Adaption of Large Steerable Arrays;" IEEE Information Theory and Applications Workshop (ITA); Feb. 5, 2012; pp. 234-239; 6 Pages.
Wagner et al., "Compressed Beamforming in Ultrasound Imaging;" IEEE Transactions on Signal Processing, vol. 60, No. 9; Sep. 2012; 15 Pages.
Wang et al., "Direction Estimation Using Compressive Sampling Array Processing;" IEEE/SP $15^{th}$ Workshop on Statistical Signal Processing; Aug. 31, 2009; 3 Pages.
U.S. Non-Final Office Action dated Oct. 26, 2018 for U.S. Appl. No. 15/260,508; 9 Pages.
U.S. Non-Final Office Action dated Nov. 19, 2018 for U.S. Appl. No. 15/346,793; 15 Pages.
Response to U.S. Non-Final Office Action dated Oct. 26, 2018 for U.S. Appl. No. 15/260,508; Response filed Dec. 5, 2018; 7 Pages.
U.S. Notice of Allowance dated Jan. 25, 2019 for U.S. Appl. No. 15/260,508; 9 Pages.
U.S. Non-Final Office Action dated Nov. 1, 2018 for U.S. Appl. No. 15/260,715; 10 Pages.
Response to U.S. Non-Final Office Action dated Nov. 1, 2018 for U.S. Appl. No. 15/260,715; Response filed Nov. 28, 2018; 11 Pages.
U.S. Notice of Allowance dated Jan. 25, 2019 for U.S. Appl. No. 15/260,715; 9 Pages.
Response to U.S. Non-Final Office Action dated Nov. 19, 2018 for U.S. Appl. No. 15/346,793; Response filed Jan. 25, 2019; 10 Pages.
Final Office Action dated May 16, 2019 for U.S. Appl. No. 15/346,793, 21 pages.
Ying Wang, Geert Leus, Ashlish Pandharipande, Direction Estimation Using Comprehensive Sampling Array Processing, 2009, IEEE, pp. 626-629 (4 pages).
A.Nalobin, I. Rolfes, Utilization of the Array Factor for Narrowband Direction of Arrival Estimate, 2015, IEEE, pp. 404-405, (2 pages).
Notification Concerning Transmittal of the International Preliminary Report on Patentability dated May 23, 2019 for International Application No. PCT/US2017/048319; 1 Page.
International Preliminary Report on Patentability dated May 23, 2019 for International Application No. PCT/US2017/048319; 1 Page.
Written Opinion of the International Preliminary Report on Patentability dated May 23, 2019 for International Application No. PCT/US2017/048319; 11 Page.
Response to Final Office Action dated May 16, 2019 for U.S. Appl. No. 15/346,793, filed Aug. 16, 2019; 11 Pages.
International Preliminary Report on Patentability dated Mar. 21, 2019 for International Application No. PCT/US2017/024015; 10 Pages.
Response to Rue 161(1) and 162 EPC Communication dated Apr. 16, 2019 for European Appl. No. EP17717569.2 as filed on Aug. 30, 2019: 12 pages.
Non Final Office Action dated Nov. 15, 2019, U.S. Appl. No. 15/346,793, 12 pages.

* cited by examiner

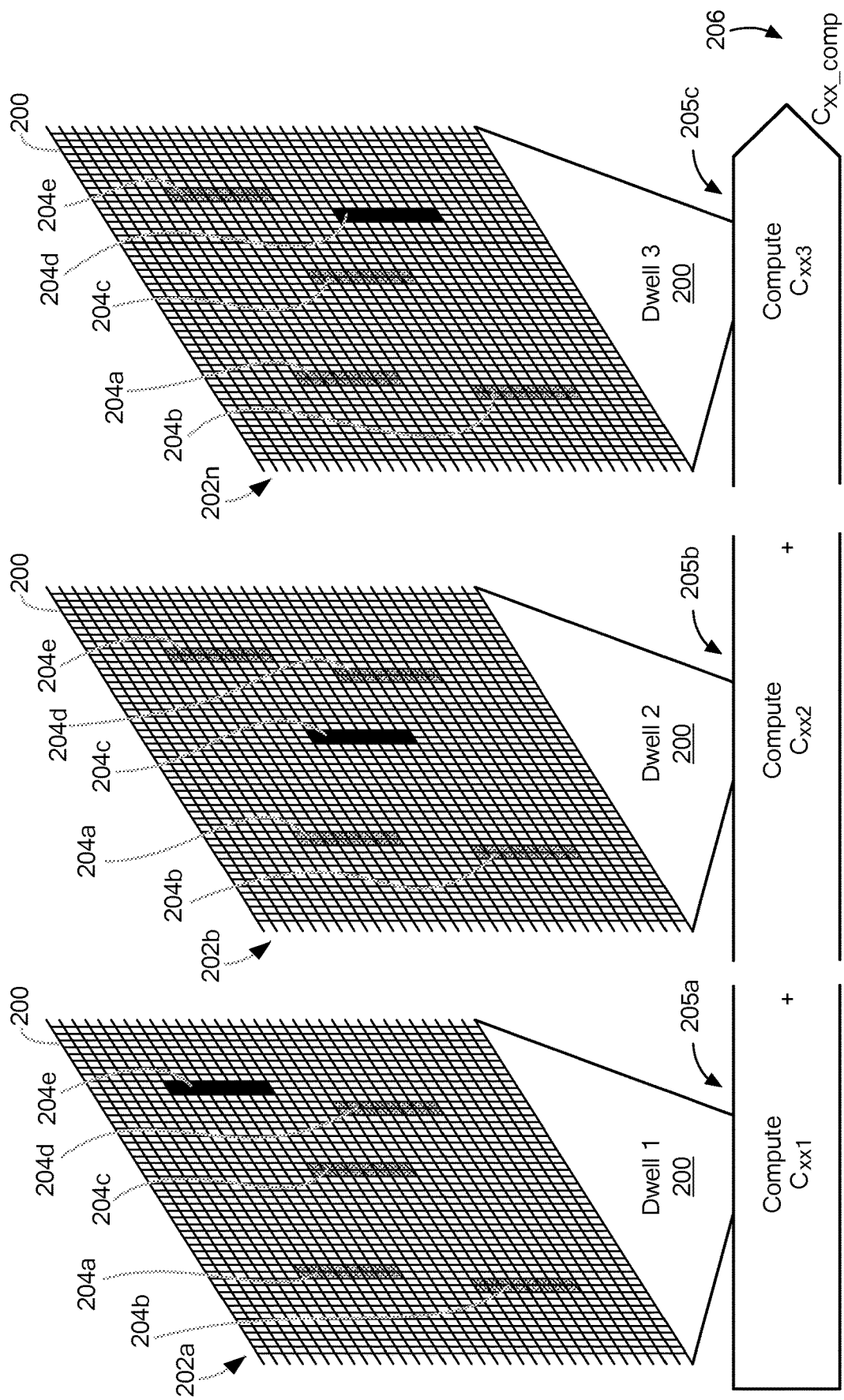

SYSTEMS AND METHODS FOR DIRECTION FINDING USING AUGMENTED SPATIAL SAMPLE COVARIANCE MATRICES

CROSS-REFERENCE TO RELATED APPLICATIONS

This application is a divisional application of U.S. patent application Ser. No. 15/260,715 filed on Sep. 9, 2016, which application is hereby incorporated herein by reference in its entirety.

GOVERNMENT INTERESTS

This invention was made with the government support. The government has certain rights in this invention.

BACKGROUND

As is known in the art, direction finding (DF) may be described as a determination of a direction from which a received radio frequency (RF) signal was transmitted. To make such a determination, a DF system receives RF signals at one or more antenna elements and processes the signals in a receiver. Increasing the number of antenna elements which receive the RF signal and providing each received signal to a receiver channel for further processing can increase the accuracy of the estimate. Many receive systems, however, have a limited number of receiver channels with which to simultaneously receive and process the samples from multiple antenna elements.

SUMMARY

The concepts, systems and methods described herein are directed towards direction finding (DF) techniques using a switched network architecture to couple a first plurality of antenna elements to a second, fewer, plurality of channels of a radio frequency (RF) receiver. The RF receiver provides appropriately processed signals to a DF processor which combines data sampled at phase centers of the plurality of array elements. Such combined data samples may then be used to estimate a direction of a received signal. In some embodiments, the antenna elements are configured into subarrays and a switch network couples different groups of subarrays to the RF receiver channels during different dwell times. Data collected during each dwell used to generate a spatial sample covariance matrix (SCM) and multiple spatial SCMs one combined to provide an aggregate covariance matrix values in the aggregate covariance matrix are then used to estimate a direction of a received signal.

In accordance with the concepts described herein a DF system includes, a first plurality of array antenna elements is coupled to a second, different plurality of RF receiver channels through a switch network. In some embodiments, the number of array antenna elements may be greater than the number of receiver channels and during a dwell time the switch network is configured to select a number of antenna elements equal to a number of receiver channels such that signals are coupled from a selected number of antenna elements equal to an equal number of receiver channels. This approach allows data to be collected from phase centers of a plurality of array elements and be substantially simultaneously provided to individual receiver channels of the RF. This is repeated for different pluralities of antenna elements during different dwell times.

In some embodiments, the antenna elements are formed into subarrays. In response to control signals provided thereto, the switch network switches between different ones of a plurality of subarrays of an array antenna so as to gather data from different subarrays during different dwell times.

Each subarray may comprise one or more antenna elements. Significantly, during a first dwell time the switch network simultaneously couples a selected combination or group of subarrays to a set of receiver channels where the number of subarrays equals the number of receiver channels. During a next dwell time the switch matrix couples a different combination (or group) of subarrays to the receiver channels. This process is repeated for each of a plurality of dwell times and a like plurality of groups of subarrays. Thus, the receiver generates data samples from a plurality of different groups of subarrays at a like plurality of different dwell times. The data may be collected substantial at the phase centers of each subarray although it should be appreciated that each subarray need not have the same phase center.

The data collected during each dwell is used to generate a complex spatial SCM. Each of the so-generated dwell SCM's can be combined to form an aggregate covariance matrix. Complex angle information from the aggregate covariance matrix can be extracted and provided to a DF processor which uses values from the aggregate covariance matrix to provide an output signal indicative of the direction of the received signal.

In an embodiment, the DF processor uses a MINDIST technique to provide an accurate determination of a direction of arrival of RF signals incident on an antenna having arbitrarily located antenna phase centers in a computationally efficient manner. In an embodiment, the MINDIST technique compares elements (i.e., matrix elements) of a reduced dimension spatial SCM to principal component vectors for a given phase center location as a function of antenna beam angle and frequency. The principal component vectors may be stored in one or more tables and grouped or otherwise organized as a function of phase center location, antenna beam angle and/or frequency.

In an embodiment, the SCM elements from the aggregate covariance matrix having a non-zero angle (i.e., an angle that is greater than or less than zero) may be identified and a portion of such non-zero elements may be used to generate principal components for a principal component table (or p-table).

By eliminating components of the SCM having a value of zero and recognizing a symmetric nature of the SCM less than one-half of the SCM elements are required for computations. By extracting one-half of the SCM elements and using them in later computations, a total computation time of the MINDIST method may be reduced. For each of the principal components, vector data may be computed and stored (e.g., in tables). In some embodiments, the vector data may be precomputed. Thus, for each of a plurality of extracted principal components, the corresponding vector data may be identified and used to generate the p-table. The p-table thus has the principal components values stored therein. In some embodiments, the extracted principal component values may be sorted by frequency and angle data.

In operation, a test point can be compared to each of the entries in the p-table to identify a minimum distance point. The MINDIST method may compare distance measurements to precomputed tables making the methods herein computationally feasible. The minimum distance point corresponds to a direction of arrival of the RF plane waves incident on the array elements. Thus, the MINDIST technique provides an estimation of an angle of arrival of RF signals.

In one aspect, in an array antenna having a plurality of subarrays, a method for direction finding comprises receiving signals at an array antenna and capturing data with a plurality of groups of subarrays. In an embodiment, each group of subarrays may capture data during a selected one of a plurality of different dwell times. The method further comprises generating a plurality of dwell spatial SCMs using data corresponding to one or more of the plurality of groups of subarrays and combining the plurality of dwell spatial SCMs in complex form to generate an aggregate covariance matrix.

In an embodiment, the method further comprises pre-computing a principal component table using angle and frequency measurement for one or more principal components, extracting the one or more principal components as complex phases from the aggregate covariance matrix to form a test point, determining a distance between the test point and each value in the pre-computed principal component table and identifying a minimum distance point based on the determined distances between the test point and each value in the principal component table, wherein the minimum distance point corresponds to a direction of the received signals.

In some embodiments, the data may be captured at a plurality of stages, wherein each stage includes two or more switches. For example, data may be received at a first stage from at least one subarray and the data may be provided to two or more switches in a second stage of switches. The data may be received at the second stage of switches from the first stage of switches and the data may be provided from a portion of the at least one subarray to a direction finding module.

In an embodiment, the method comprises generating one or more dwells using the data from the plurality of groups of subarrays, wherein each dwell corresponds to at least one dwell time of the plurality of different dwell times. In some embodiments, the method comprises capturing the data at a first subarray at a first dwell time, capturing the data at a second subarray at a second dwell time, generating a dwell spatial SCM for each of the first subarray and the second subarray and combining the dwell spatial SCMs in complex form to form the aggregate covariance matrix.

In an embodiment, the method comprises providing a first group data from a first group of subarrays to a switch matrix and providing a second group of data from a second group of subarrays directly to a direction finding module. The data may include angle measurements corresponding to the received data relative to a phase center of one or more of the plurality of array elements. In some embodiments, each of the dwell SCMs and the aggregate covariance matrix may include angle measurements for the plurality of array elements. The method may comprise identifying a phase difference between each of the elements in the aggregate covariance matrix using the angle measurements.

In an embodiment, the method comprises determining vector data for each of the plurality of array elements. The vector data may include angle and frequency measurements. In some embodiments, the principal component table may include principal component data sorted by frequency measurements and angle measurements for each of the one or more principal components.

In another aspect, a system for direction finding is provided comprises a plurality of array elements to receive signals, a direction finding module and one or more receiver channels to couple the plurality of array elements to the direction finding module. In an embodiment, the number of array elements may be greater than the number receiver channels. The one or more receiver channels comprise a switch matrix disposed in a signal path between the plurality of array elements and the direction finding module to switch between different groups of subarrays of the plurality of array elements and collect data for at least one group of subarrays during a selected one of a plurality of dwell times and provide the data to the direction finding module.

In an embodiment, at least one array element in each of the groups of subarrays may be active and at least one array element in each of the groups of subarrays may be inactive. The switch matrix may comprise a plurality of stages and each of the plurality of stages may include two or more switches. In some embodiments, a first stage of switches may be coupled to each of the plurality of array elements to receive the data from at least one group of subarrays and may be configured to provide the data to two or more switches in a second stage of switches. The second stage of switches may be coupled to the first stage of switches to receive the data from the first stage of switches and may be configured to provide the data from a portion of the at least one group of subarrays to the direction finding module.

In an embodiment, the plurality of array elements may comprise a first group of array elements coupled to the switch matrix and a second group of array elements coupled directly to the direction finding module.

In an embodiment, the direction finding module comprises a spatial SCM module to receive the data and generate one or more dwell spatial SCMs and an aggregate covariance matrix using the data, a p-table module to generate a table having components as a function of frequency and angle measurements, and a principal component module coupled to the SCM module and the p-table module. The principal component module may generate a principal component table having one or more principal components sorted by the frequency and angle measurements. The direction finding module further comprises a distance measurement module coupled to the principal component module. The distance measurement module may calculate a distance from a test point to each entry in the principal component table and a minimum distance module coupled to the distance measurement module. The minimum distance measurement module may determine a minimum distance point based on the calculated distances from the test point to each entry in the principal component table.

BRIEF DESCRIPTION OF THE DRAWINGS

The foregoing concepts and features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the concepts, systems and techniques described herein. Like numbers in the figures denote like elements.

FIGS. 2A-2C are illustrations of different combinations of subarrays being used during different dwell times of the DF system of FIG. 1;

DETAILED DESCRIPTION

Figure 1:
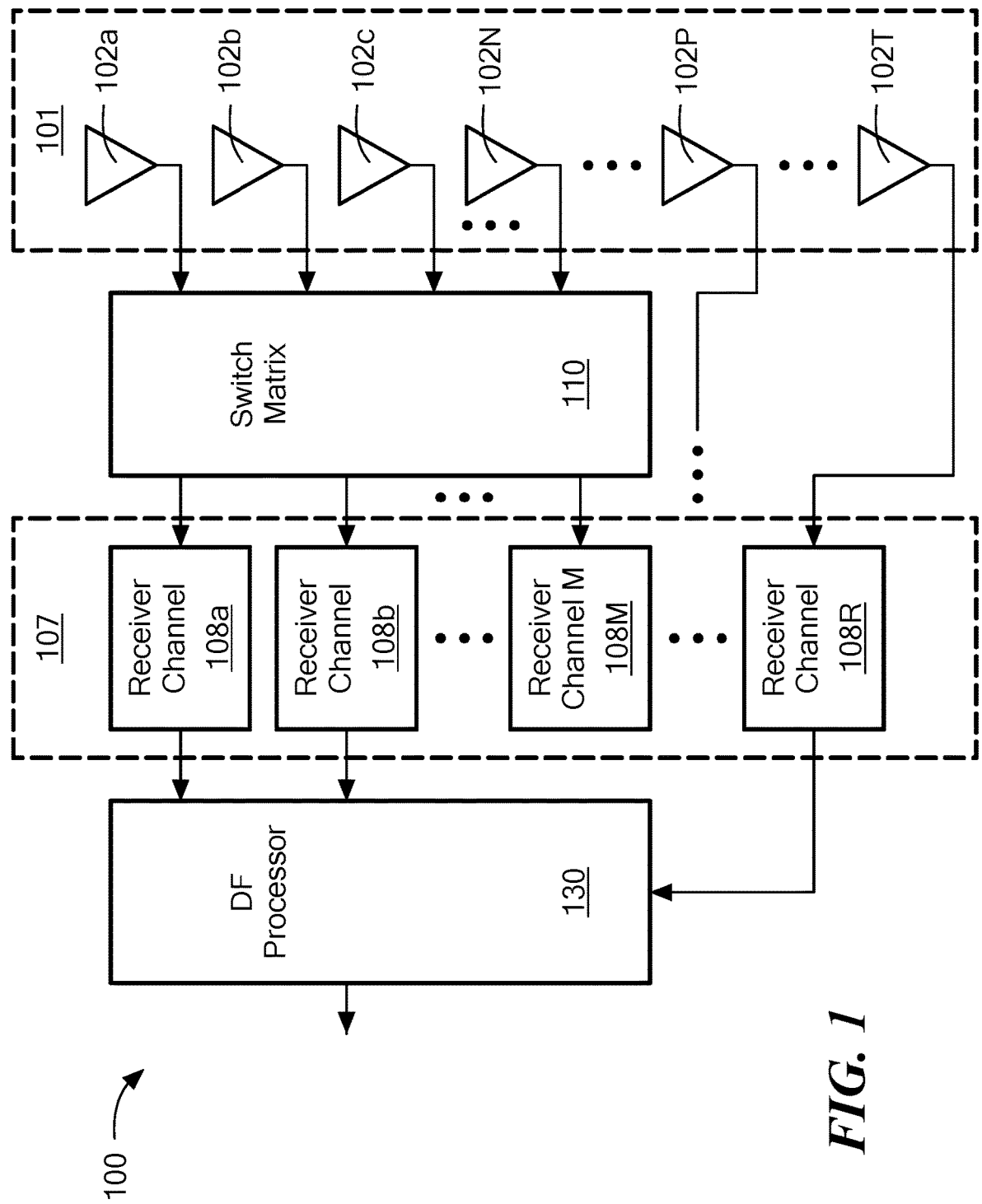
FIG. 1 is a block diagram of a direction finding (DF) system having subarrays coupled to individual receiver channels through a switch network.

Now referring to FIG. 1, a direction finding (DF) system 100 includes an array antenna 101 having a plurality of subarrays 102a-102T. Each of the subarrays 102a-102T may comprise one or more individual antenna elements (also referred to as "elements" or "radiators"). Thus, each subarray 102a-102T may represent a single antenna element or multiple antenna elements.

For reasons which will become apparent from the description herein below, during each of multiple dwell times, a switch network (also sometimes referred to herein as a switch matrix) 110 couples selected ones of a first plurality of subarrays (here, selected ones of subarrays 102a-102N) to a second, fewer plurality of receiver channels (here, receiver channels 108a-108M) of a receiver 107. One or more other subarrays (e.g. subarrays 102p-102T) may be coupled directly to individual receiver channels (e.g. receiver channel 108R) of receiver 107. Receiver 107 processes the signals provided thereto as is generally known. Receiver channels 108a-108R may operate, for example, to amplify and/or down convert and/or demodulate the signals provided thereto.

Outputs of receiver 107 are coupled to a DF processor 130. DF processor 130 receives the signals provided thereto and processes the signals to generate an estimate of a direction of arrival (i.e. angle of arrival) of a radio frequency (RF) plane wave incident on array antenna 101. DF processor 130 may, for example, utilize a minimum distance (MINDIST) technique to produce a DF output signal indicative of a direction from which the received signal emanated. The MINDIST technique is described in co-pending application Ser. No. 15/260,508, entitled "Systems And Methods For Direction Finding Based On Minimum Distance Search To Principal Components," filed on the same date herewith, assigned to the assignee of the present application, and hereby incorporated herein by reference in its entirety.

As noted above, in an embodiment, each subarray 102a-102T may comprise one or more antenna elements. In some embodiments, each subarray may include two or more array elements. In one embodiment, each subarray may include a single element. In some embodiments, each subarray may include the same number of elements. In other embodiments, different subarrays may include a different number of elements.

A number of array elements to include in a particular subarray may be selected based, at least in part, upon a total number of elements in array antenna 101, a number of individual receiver channels included in receiver 107, a desired gain pattern of DF system 100, and/or a field of view (FoV) of DF system 100. It should also be appreciated that any type of antenna element may be used to implement array antenna 101.

It should also be appreciated that switch matrix 110 may be provided from any of a variety of different types of switches including multi-pole switches or multi-throw switches. A particular type of switch used in switch matrix 110 may depend at least in part on a particular application of the DF system 100 and the components of the DF system 100 (e.g., number of array elements, number of receiver channels).

Further, it should be appreciated that in the illustrative embodiment of FIG. 1, some of the subarrays (i.e. subarrays 102a-102N) are coupled to receiver channels through switch matrix 110 while other subarrays (e.g. subarrays 102p-102T) are coupled directly to individual channels of receiver 107. As will be described below in conjunction with FIG. 3A, in some embodiments, all subarrays may be coupled to receiver channels through a switch network. It should be appreciated that the particular number of subarrays to couple to receiver channels through a switch (e.g. switch matrix 110) may be selected based upon a particular application of DF system 100 and/or a number of subarrays required for desired system operation as compared with a number of receiver channels 108a-108R.

Now referring to FIGS. 2A-2C, in which like elements are provided having like reference designations, an array antenna 200 utilizes selected ones of five subarrays 204a-204e in different combinations (or groups) to perform direction finding. It should be appreciated that in this illustrative embodiment, it is assumed that antenna 200 provides signals to a four channel receiver. Thus, it is not possible to simultaneously connect all five subarrays to a unique receiver channel. Thus, as illustrated in FIG. 2A, during a first dwell time 202a, a first group (or combination) of subarrays, here four subarrays 204a-204d, are active to receive signals. A fifth one of the subarrays (here subarray 204e) is made inactive. Thus, during the first dwell time 202a RF signals received via a first group of subarrays (i.e. subarrays 204a-204d) are coupled through a switch (e.g. switch matrix 110 described above in FIG. 1) to individual receiver channels (e.g. receiver channels 108a, 108b, 108c, 108d in FIG. 1) such that signals from each of the selected subarrays 204a-204d may be simultaneously processed (e.g. in a DF processor such as DF processor 130 described above in FIG. 1) to generate a first dwell spatial sample covariance matrix (SCM) 205a.

Similarly, and referring to FIG. 2B, during a second dwell time 202b, a second different group (or combination) of subarrays (here subarrays 204a, 204b, 204d, 204e) are selected to receive signals. A fifth one of the subarrays (here subarray 204c) is inactive. Thus, during the second dwell 202b, RF signals received via the second group of subarrays (i.e. subarrays 204a, 204b, 204d, 204e) are coupled through a switch to individual receiver channels such that signals from each of the selected subarrays may be simultaneously processed to provide a second dwell spatial SCM 205b.

Similarly, and referring to FIG. 2C, during a third dwell time 202c, a third, different group (or combination) of subarrays (here subarrays 204a, 204b, 204c, 204e) are selected to receive signals. A fifth one of the subarrays (here subarray 204d) is inactive. Thus, during a third dwell 202c, RF signals received via the third group of subarrays (i.e. subarrays 204a, 204b, 204c, 204e) are coupled through a switch to individual ones of four receiver channels such that signals from each of the selected subarrays may be simultaneously processed to provide a third spatial SCM 205c.

With this arrangement, data is captured during a plurality of different dwells 202a-202c using three different groups (or combinations) of subarrays, i.e. a first group comprising subarrays 204a-204d; a second group comprising subarrays 204a, 204b, 204d and 204e; and a third group comprising subarrays 204a-204c and 204e. Thus, data is provided from a specific group of subarrays at specific dwell times. Stated differently, during each of the first, second and third dwells 202a-202c signals are received with different combinations (or groups) of subarrays 204a-204e. Thus, the data sampled from the different groups of subarrays 204a-204e are sampled at different periods of time.

Although FIGS. 2A-2C illustrate only three dwells and three groups of subarrays, it should be appreciated that any number of subarrays and any number of dwells may be used. The number of dwells to use in a particular application is based, at least in part, on the number of subarrays and/or receiver channels in a DF system.

As illustrated in FIGS. 2A-2C, during each of the different dwells 202a-202c, at least one of the subarrays is inactive. An inactive subarray may refer to a subarray which is configured or otherwise coupled to not receive any signals or may refer to a subarray having an output not coupled to a receiver channel. As will be described in conjunction with FIG. 3B this may be accomplished, for example, by coupling a subarray to a matched termination.

Once the data is collected, the first, second and third dwell spatial SCMs 205a-205c can be combined in complex form to generate an aggregate covariance matrix (AGM). The dwell SCMs and dwell AGM will be described in greater detail below in conjunction with FIGS. 3-4B.

Figure 3A:
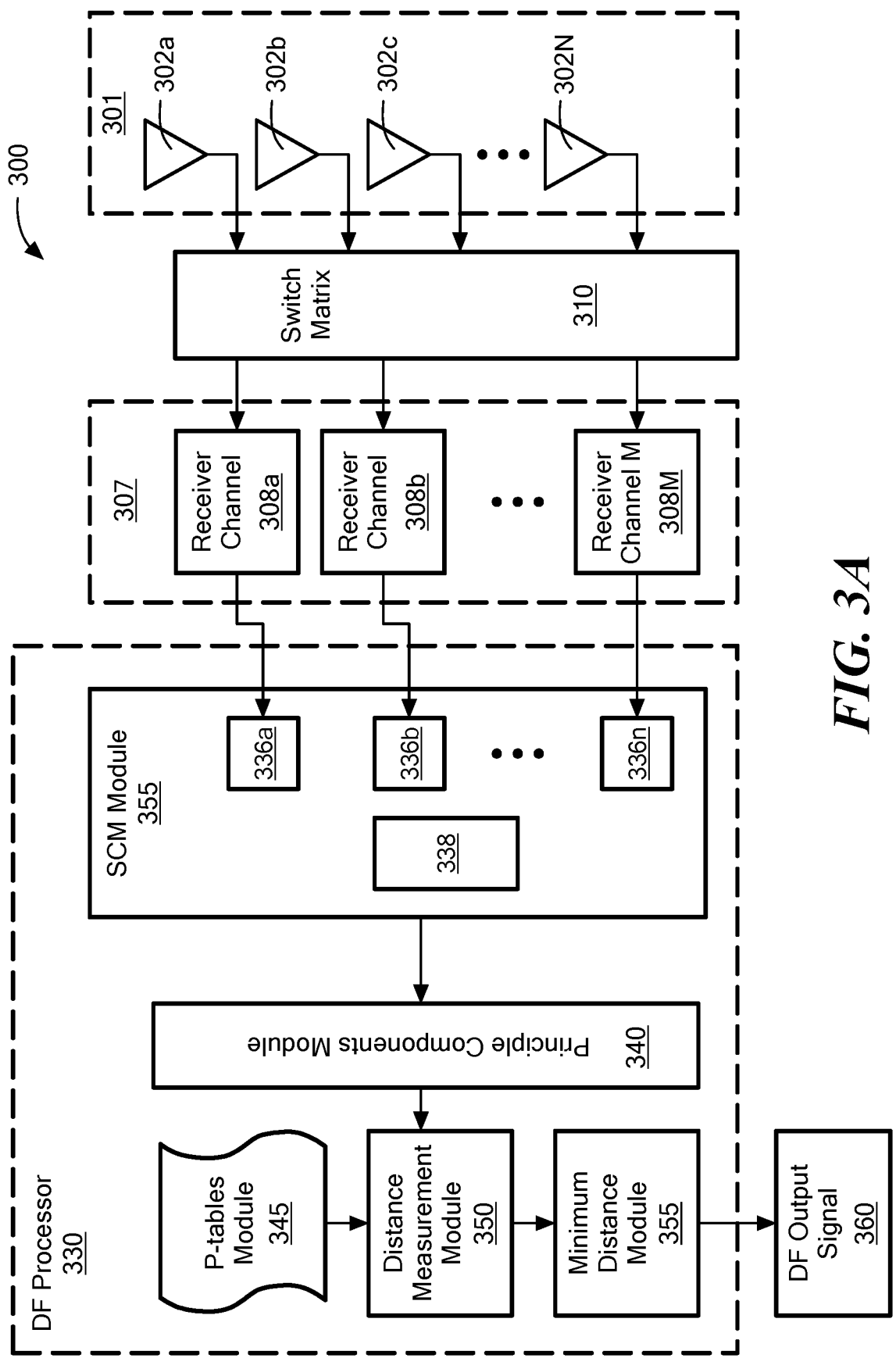
FIG. 3A is block diagram of a DF system having a switch network disposed between a plurality of array elements.

Now referring to FIG. 3A, a DF system 300 includes an array antenna 301 comprising a plurality of subarrays 302a-302N coupled through a switch matrix 310 to a second different plurality of RF receiver channels 308a-308M of an RF receiver 307. Outputs of receiver channels 308a-308M are coupled to inputs of a DF processor 330. In the illustrative embodiments of FIG. 3A, DF processor 330 implements a MINDIST DF technique. Array 301, subarrays 302a-203N, switch matrix 310 and receiver channels 308a-308M may be the same as or similar to subarrays 102a-102T, switch matrix 110 and receiver 107 described above in conjunction with FIG. 1 and array 200 of FIGS. 2A-2C.

In some embodiments, the plurality of array elements 302a-302N, switch matrix 310 and the plurality of receiver channels 308a-308M may be separate from DF processor 330. In other embodiments, the plurality of array elements 302a-302N, switch matrix 310 and the plurality of receiver channels 308a-308M may be integrated within DF processor 330.

It should be appreciated that in this illustrative embodiment, all subarrays 302a-302N are coupled to receiver channels 308a-308M through the switch matrix 310.

In an embodiment, the number of subarrays 302a-302N may be greater than the number of receiver channels 308a-308M (i.e. N>M). Thus, switch matrix 310 may be operated to couple selected ones (or groups or combinations) of subarrays 302a-302N to individual receiver channels 308a-308M.

A group of M subarrays may be designated for use at a specific dwell time. Thus, for each dwell time, samples of data from the pre-selected the group of M subarrays may be coupled through the switch matrix 310 to the M receiver channels 308a-308M and subsequently to DF processor 330.

The particular subarrays used in each group of subarrays from which signals are received may change from one dwell time to a next dwell time. Also, in some embodiments, each group of subarrays may include one or more active and one or more inactive array elements. In some embodiments, to form different groups of subarrays, the array elements that are active versus inactive may change from one dwell time to a next dwell time.

For example, in an embodiment, during a first dwell time switch matrix 310 may operate to couple a subarray to reference potential (e.g., ground) through a matched load such that the subarray, terminates, rejects or ignores signals provided thereto during a first dwell time. Thus, the respective subarray may be considered to be inactive as no data is being sampled from the respective subarray. During a second dwell time, however, the same respective array element may be considered active as data is being sampled from the respective array element. In an embodiment, the number of active subarrays is selected based upon the number of array elements, a number of receiver channels.

In an embodiment, signals received via subarrays 302a-302N may be samples of signals incident on the respective array element at specific points in time (e.g., a snapshot at a particular dwell time). The samples of data may be taken at or relative to a phase center of respective ones of array elements 302a-302N.

The data may be expressed as complex values (e.g., I/Q data) representing the signal. For example, in some embodiments, the data may correspond to voltage signals represented as complex values representing angle of arrival, amplitude, phase, and/or a polarization of the signal, for example. In an embodiment, the data may correspond to a value of a signal at a predetermined point in time (e.g., a snapshot at a particular dwell time) or over a predetermined time period. The data corresponding to the plurality of signals may be coupled or otherwise provided to an input of the DF processor 330.

In the illustrative embodiment of FIG. 3A, the DF processor 330 includes a spatial SCM module 335, a principal components module 340, a distance measurement module 350, a minimum distance module 355 and a p-table module 345.

The SCM module 335 receives data provided thereto from receiver 307 and generates a matrix of values (i.e., an SCM) using the data (which may be samples of data). For example, SCM module 335 may generate a plurality of dwell SCMs 336a-336N. Each dwell SCM 336a-336N can be associated with one or more receiver channels 308a-308M. In some embodiments, each dwell SCM 336a-336N can be associated with a respective receiver channel 308a-308M. In other embodiments, each dwell SCM 336a-336N can be associated with multiple receiver channels 308a-308M. Each dwell SCM 336a-336N may be based, at least in part, on data sampled from a selected group of subarrays 302a-302N at specific dwell time (e.g. one of dwells 202a-202c in FIGS. 2A-2C) and provided by the switch matrix 310 to a receiver channel 308a-308M associated with the selected group of subarrays 302a-302N at that specific dwell time. Examples of dwell SCM's generated using dwells such as those shown in FIGS. 2A-2C are provided below in Tables 1-3.

Table 1 below is an illustration of complex data values of the type of which may be sampled during a first dwell (e.g. dwell 202a of FIG. 2A) by a first group of subarrays (e.g. subarrays 204a-204d in FIG. 2A).

TABLE 1

| | | | | |
|---|---|---|---|---|
| 27.1313 | −25.3736 − j6.0954 | 1306061 − j20.2535 | 25.2114 + j5.9324 | 0 |
| −25.3734 + j6.0954 | 26.879 | −8.4809 + j22.7156 | −25.8083 + j0.1241 | 0 |
| 13.6061 + j20.2535 | −8.4809 − j22.7156 | 23.5265 | 8.3668 + j22.5207 | 0 |
| 25.2114 − j5.9324 | −25.8083 − j0.1241 | 8.3668 − j22.5207 | 26.5831 | 0 |
| 0 | 0 | 0 | 0 | 0 |

It should be noted that the data sampled for a first dwell is expressed in complex form thereby preserving both amplitude and phase of the received signal from which the matrix values are generated. The entries having a "0" value represent an inactive subarray (i.e. a subarray with which data was not sampled and thus not provided to the DF processor 330). For example, and briefly referring to FIG. 2A, Table 1 may represent data from a group of subarrays 204a-204e with four subarrays 204a-204d being active and one subarray 204e being inactive. Thus, the fifth row and fifth column of the matrix corresponds to the inactive fifth subarray 204e and thus, the matrix values in the fifth row are zero.

Table 2 below is an illustration of complex data values of the type which may be sampled for a second dwell (e.g. dwell 202b of FIG. 2B).

TABLE 2

| | | | | |
|---|---|---|---|---|
| 27.3245 | −25.4644 − j6.0953 | 0 | 25.2159 + j5.9324 | −9.9436 + j24.1408 |
| −25.4644 − j6.0953 | 26.9083 | 0 | −25.6667 + j0.1241 | 4.0905 − j25.6354 |
| 0 | 0 | 0 | 0 | 0 |
| 25.2159 − j5.9324 | −25.6667 − j0.1241 | 0 | 26.348 | −3.9979 + j25.4416 |
| −9.9436 − j24.1408 | 4.0905 + j25.6354 | 0 | −3.9979 − j25.4416 | 27.0664 |

The data captured during the second dwell is also expressed in complex form. Briefly referring to FIG. 2B, Table 2 is an illustration of data which may be provided from a selected group of active subarrays (e.g. subarrays 204a, 204b, 204d, 204e and an inactive subarray (i.e. subarray 204c). Thus, the matrix values in the third row and column of the matrix corresponding to inactive subarray 204c are zero.

Table 3 below represents complex data values captured during a third dwell (e.g. dwell 202c of FIG. 2C).

TABLE 3

| | | | | |
|---|---|---|---|---|
| 27.2336 | −25.4096 − j6.0950 | 13.6792 − j20.2522 | 0 | −9.9754 + j24.1393 |
| −25.4096 + j6.0950 | 26.8858 | −8.4945 + j22.7141 | 0 | 3.9047 − j25.6338 |
| 13.6792 + j20.2522 | −8.4945 − j22.7141 | 23.6675 | 0 | −23.6508 + j4.7847 |
| 0 | 0 | 0 | 0 | 0 |
| −9.9754 − j24.1393 | 3.9047 + j25.6338 | −23.6508 − j4.7847 | 0 | 27.0452 |

In an embodiment, the data sampled for third dwell 202c of FIG. 2 is in complex form representing the signal using real and imaginary parts.

Briefly referring to FIG. 2, Table 3 may represent data from a group of five subarrays 204a-204e. Of the five subarrays, the first, second, third and fifth subarrays 204a, 204b, 204c, 204e may be active and the fourth subarray 204d may be inactive. Thus, the fourth row and column of data corresponding to the inactive fourth subarray 204d have values of zero.

In an embodiment, the SCM module 335 may combine each of the dwell SCMs to generate an aggregate covariance matrix. The dwell SCMs may be combined in complex form (e.g., quadrature space), thus the aggregate covariance matrix also includes complex data. For example, an example aggregate covariance matrix is provided below in Table 4.

TABLE 4

| | | | | |
|---|---|---|---|---|
| 81.6894 | −76.2475 − j18.2857 | 27.2853 − j40.5056 | 50.4272 + j11.8648 | −19.9189 + j48.2801 |
| −76.2475 + j18.2857 | 80.6731 | −16.9755 + j45.4297 | −51.4751 + j0.2482 | 7.9952 − j51.2692 |

TABLE 4-continued

| | | | | |
|---|---|---|---|---|
| 27.2853 + j40.5056 | −16.9755 − j45.4297 | 47.1941 | 8.3668 + j22.5207 | −23.6508 + j4.7847 |
| 50.4272 − j11.8648 | −51.4751 − j0.2482 | 8.3668 − j22.5207 | 52.9312 | −3.9979 + j25.4416 |
| −19.9189 − j48.2801 | 7.9952 + j51.2692 | −23.6508 − j4.7847 | −3.9979 − j25.4416 | 54.1116 |

In an embodiment, the aggregate covariance matrix of Table 4 is a combination of the combined values of the dwell SCMs of Tables 1-3. The SCM module 335 may generate an angle SCM that identifies an angle of each of the SCM entries in the aggregate covariance matrix. For example, using the real and imaginary parts of the complex number in each entry of the aggregate covariance matrix, the SCM module 335 may calculate a complex angle for each entry of the aggregate covariance matrix. The complex angles from each of the entries may be used to form the angle SCM. For example, an example angle SCM is provided below in Table 5.

TABLE 5

| | | | | |
|---|---|---|---|---|
| 0 | −2.9062 | −0.978 | 0.2311 | 1.9621 |
| 2.9062 | 0 | −1.9284 | 3.1368 | −1.4161 |
| 0.978 | −1.9284 | 0 | 1.2151 | 2.942 |
| −0.2311 | −3.1368 | −1.2151 | 0 | 1.7267 |
| −1.9621 | 7.9952 + j51.2692 | −2.942 | −1.7267 | 0 |

In an embodiment, Table 5 represents an angle SCM generated using the data from aggregate covariance matrix of Table 4 and thus, using the data from the first, second and third dwells 202a-202c of FIGS. 2A-2C. The angles in Table 5 are represented in terms of radians. In an embodiment, by combining data from a plurality of groups of subarrays corresponding to a plurality of array elements, an accurate angle SCM can be generated that is the same as or substantially similar to an angle SCM generated using data from each of the plurality of elements at a single dwell time.

The SCM module 335 may provide the angle SCM to an input of the principal components module 340. In some embodiments, the SCM module 335 may only provide a portion of the entries of the angle SCM (e.g., so-called principal components as will be explained in detail further below) to the principal components module 340.

The principal components module 340 may extract so-called principal components from the angle SCM. In an embodiment, the principal components may correspond to the SCM entries having a non-zero angle. A non-zero angle refers to an angle that is greater than or less than 0 (thus not equal to zero). For example, the angle SCM may include SCM entries that compare data taken at array elements to themselves (e.g., ΔΦxx=0). Thus, the respective angle for these entries may equal zero.

Referring back to Table 5 above, the values along the main diagonal of the angle SCM represent the difference between two samples of data taken at the same array element. Hence, the values of the main diagonal are ideally equal to zero. In some embodiments, the SCM entries having an angle equal to zero may be removed from further processing or ignored. Thus, SCM entries having a non-zero angle may be extracted from the SCM.

In some embodiments, the principal components module 340 may extract only a portion of the non-zero angle SCM entries. For example, the angle SCM may include SCM entries that compare the two different array elements (i.e. array element M and array element N) to generate a first SCM entry ΔΦmn and a second SCM entry ΔΦnm. In this case, it has been recognized that the first SCM entry will be equal in amplitude to the second SCM entry (e.g., ΔΦmn=ΔΦnm). For example, and referring to table 5 above, the value in the first column, second row may correspond to the value in the second column, first row. Thus, only one of these two values, one of the first and second SCM entries, may be needed for processing.

In one embodiment, the principal components module 340 extracts one-half of the angle SCM entries having a non-zero angle. The principal components module 340 may generate a non-zero SCM entry table comprising the extracted angle SCM entries having a non-zero angle.

The p-table module 345 may generate one or more tables having stored therein principle component values (p-table values). The p-table values may be stored and indexed for example, as a function of angle and frequency. In an embodiment, the angle corresponds to an angle of arrival of a received signal incident on one or more of the plurality of array elements 302a-302n. In some embodiments, the angles may be sorted two-dimensional angles (e.g., azimuth angle, elevation angle).

In an embodiment, p-table may be provided as a precomputed table (e.g., a table having precomputed values stored therein) or a principal component table (e.g., a table having principal components based on measured data). The pre-computed p-table may be generated using the same methods as described above, however, the pre-computed p-table may be generated using previous data measurements and/or estimates. For example, the p-table may be precomputed using previously collected snapshots at one or more of the plurality of array elements 302a-302N. The data from the previous snapshots may be used to generate a pre-computed angle SCM). Using the pre-computed angle SCM, principal components may be identified and extracted from the SCM. Thus, the precomputed p-table may be generated using the extracted principal components based on the data from the previous snapshots.

In other embodiment, the p-table may be precomputed using estimated array properties (e.g., array manifold vector properties). For example, estimated array properties may be used to generate estimated snapshots for one or more of the plurality of array elements 302a-302N. The pre-computed p-table may be generated using the methods as described above based on the estimated data (e.g., snapshots) for the array elements 302a-302N.

In an embodiment, the frequency and angle components may be precomputed based upon estimations or previously collected data. For example, in some embodiments, the frequency and angle components may be pre-computed using previously collected snapshots. In other embodiments, the frequency and angle components may be precomputed using estimates performed based on known phase centers for one or more of the plurality of array 302a-302N. In some embodiments, using estimated or measured phase center locations, the frequency and angle components may be precomputed using an array manifold vector corresponding to the plurality of array elements 302a-302N.

For example, for a desired range, the p-table module 345 may perform a statistical analysis for measuring the amount of power or information contained in the data stored in the p-table. Such an analysis may be performed for all angles within a desired range relative to a predetermined azimuth range and a predetermined elevation range. In an embodiment, a principal component analysis may be used to measure the amount of power and/or information contained in multivariate data, here the desired range relative to the predetermined azimuth range and the predetermined elevation range. For example, the principal component analysis may be performed for each of the array elements over a desired frequency range using an array manifold vector corresponding to the plurality of array elements 302a-302N. Thus, the p-table module 345 may generate vector data (e.g., principal component data) for each of the plurality of array elements 302a-302N. In some embodiments, the vector data may be generated (estimated) based on the phase center locations of the plurality of array elements 302a-302N.

In some embodiments, the p-table module 345 multiplies the resulting vector data for each array element by its complex conjugate and/or the complex conjugate of vector data from another array element and stores the result in a vector data table.

In an embodiment, the p-table module 345 compares the vector data table to an SCM phase difference matrix to identify the vector data corresponding to the angle SCM entries having a non-zero angle and extract the corresponding vector data. The p-table module 345 generates a final p-table that sorts each of the SCM entries having a non-zero angle by their respective vector data (e.g., by frequency and angle data). In an embodiment, the final p-table may be a principal component table. Thus, the final p-table may include the extracted principal component data sorted or otherwise grouped or arranged by frequency and angle.

In some embodiments, the p-table module 345 may generate one or more p-tables prior to the DF processor 330 receiving signals or data from the plurality of array elements 302a-302N. In other embodiments, the p-table module 345 may generate one or more p-tables simultaneously (e.g., real-time) to the DF processor 330 receiving signals or data from the plurality of array elements 302a-302N.

In some embodiments, the number of p-tables generated may vary and/or the size or number of elements in a p-table may vary according to a particular application of the MINDIST method. For example, in some embodiments, the p-table may be generated for a desired angular field of view (e.g., ±M° az, ±N° el). Thus, the number of elements in the p-table is related at least to the desired angular field of view.

The distance measurement module 350 receives the principal component values from the principal components module 340 and receives a p-table provided by the p-table module 345. The distance measurement module 350 calculates a distance between a test point and each of the entries in the p-table. In an embodiment, the test point may refer to a data point measured in real time. For example, the test point may be formed by extracting principal components as complex phases from the aggregate covariance matrix or the angle SCM generated by SCM module 335. Thus, the test point may correspond to data currently received from array elements 302a-302N.

In an embodiment, a distance between the test point (or real time data point) to each entry in the p-table (e.g., pre-computed p-table) may be determined to identify a minimum value (e.g., closest entry) in the p-table to the test point that was collected. In some embodiments, multiple test points may be used. For example, a distance may be determined for each of a plurality of test points, from the respective test point to each entry in the p-table. The distance is the metric we are trying to optimize.

In some embodiments, the distance measurement module 350 may select a distance metric to perform the calculation. For example, and without limitation, the distance measurement module 350 may use a Mahalanbois distance or a standardized Euclidean distance to perform the calculation. In some embodiments, the Mahalanbois distance or the standardized Euclidean distance may be used to calculate the distance between each entry in the non-zero SCM (e.g., test points) and a corresponding entry in the p-table. The calculation is described below in greater detail with respect to FIGS. 4A-4B. In an embodiment in which the Euclidean distance is used, an inverse covariance matrix may be precomputed and applied to the p-table entries in order to reduce a computation time of the MINDIST method.

The minimum distance module 355 may receive the calculated distances from the distance measurement module 350. In an embodiment, the minimum distance module 355 may identify a value from the calculated distances between the test point (or multiple test points) and each entry in the p-table that is a minimum distance as compared with the other calculated distance values. The value may be a minimum distance point representative of an angle of arrival of a signal on the plurality of array elements 302a-302N.

In an embodiment, the minimum distance module 355 may output a signal indicating the minimum distance point, such as a DF output signal 360. The minimum distance may indicate the minimum value (e.g., closest entry) in the p-table to the test point that was collected. In some embodiments, the minimum distance point may correspond to the estimated angle of arrival of the signal incident on one or more of the array elements 302a-302N. Thus, the DF processor 330 may produce a DF output signal 360 representative of an estimated angle of arrival of a signal incident on one or more of the array elements 302a-302N.

In an embodiment, DF processor 330 may be the same as or substantially similar to DF module 130 described above with respect to FIG. 1.

Figure 3B:
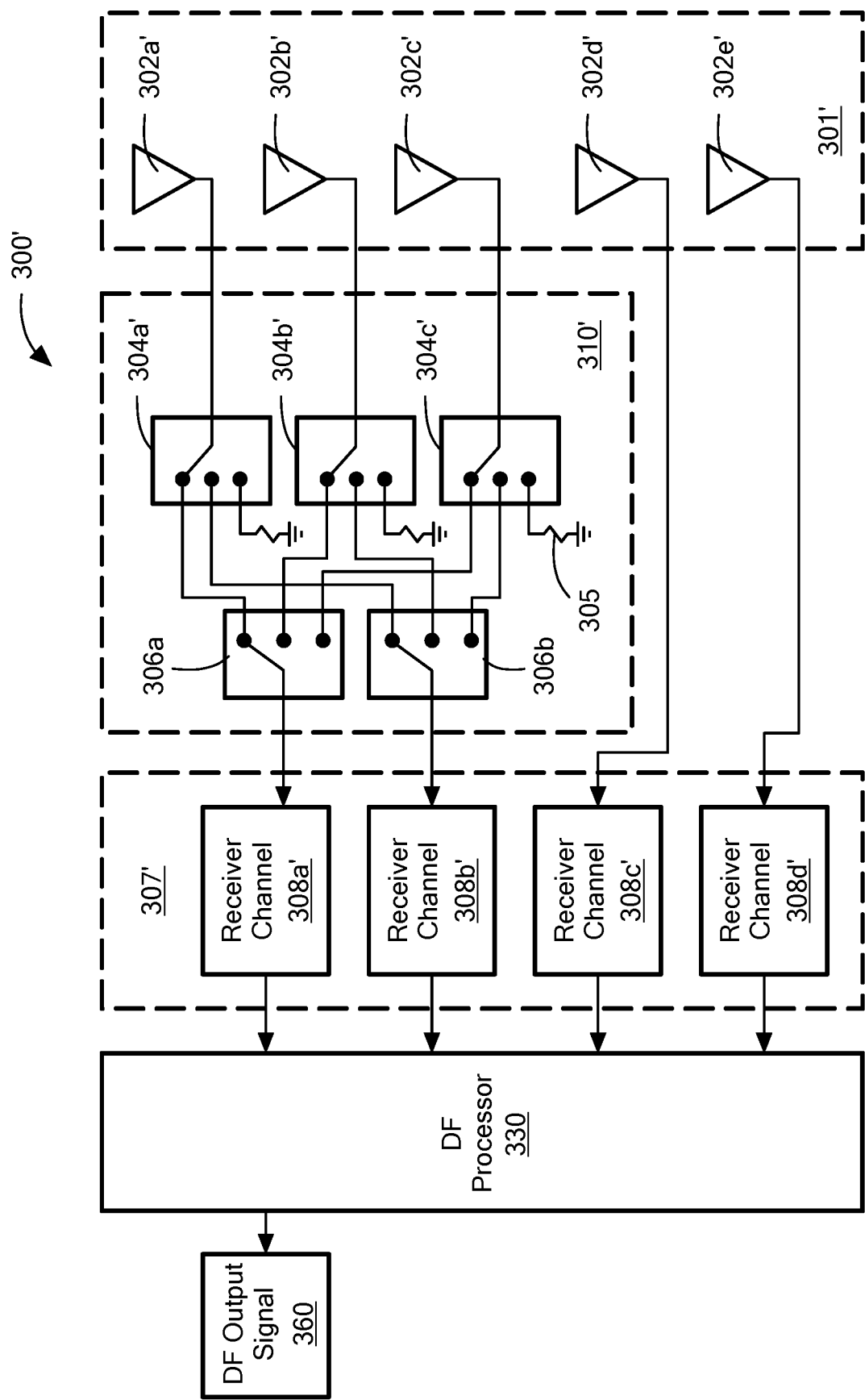
FIG. 3B is block diagram of a DF system having one or more subarrays directly coupled to receiver channels and a plurality of subarrays coupled to a few number of receiver channels through a switch network.

Referring to FIG. 3B, an illustrative DF system 300', which may be similar to DF systems 100, 300 described above in conjunction with FIGS. 1 and 3A, includes an array antenna 301' having five subarrays 302a'-302e' and a receiver 307' having four receiver channels 308a'-308d'. In this illustrative embodiment, switch matrix 310' selectively couples subarrays 302a'-302c' to receiver channels 308a' and 308b' while subarrays 302d' and 302e' are coupled directly to DF receiver channels 308c' and 308d' respectively. Thus, not all of the subarrays 302a'-302e' are coupled to switch matrix 310.

The number of subarrays coupled to RF receiver channels 308a'-308d' through switch matrix 310' versus being directly coupled to RF receiver channels 308a'-308d' (and subsequently to DF processor 330) can vary based at least in part upon a variety of factors, including but not limited to, a particular application of DF system 100 and/or a number of subarrays in array 301' as compared with a number of channels in receiver 307'.

In this illustrative embodiment of FIG. 3B, the DF system 300' includes five subarrays formed from antenna elements which make up array 301' and receiver 307' has only four channels. Three subarrays 302a', 302b', 302c' and two receiver channels 308a' and 308b' are coupled to switch network 310', and two subarrays 302d' and 302e' are directly coupled to receiver channels 308c' and 308d'. In other embodiments, however, it may be desirable or necessary for other combinations of subarrays and/or receiver channels to be coupled through a switch network.

In an alternate embodiment, however, it may be desirable or necessary for four subarrays and three receiver channels to be coupled to switch matrix 310' a single subarray directly coupled to a single RF receiver channel. Alternatively still, in other embodiments two subarrays may be selectively coupled to a single receiver channel through switch matrix 310' and three subarrays may be coupled directly to individual receiver channels. Other embodiments are also possible with systems having a different number of subarrays and receiver channels, (i.e. other than five subarrays and four receiver channels).

In the illustrative embodiment of FIG. 3B, switch matrix 310' comprises two switch stages with a first stage comprising switches 304a-304c coupled to second stage comprising switches 306a-306b. The switches may be provided as multi-pole switches and/or multi-throw switches and/or multi-pole, multi-throw switches. For example, and as illustrated in FIG. 3B, switches 304a-304c in the first stage are provided as single-pole, triple-throw switches having one input coupled to a respective one of the subarrays 302a'-302c' and three outputs. Switches 306a and 306b are also provided as single-pole, triple-throw switches. Three inputs of switches 306a and 306b are coupled to respective outputs of switches 304a-304c. Outputs of the second stage switches are coupled to respective ones of receiver channels 308a'-308b'.

Switches 304a-304c, 306a, and 306b are configured to couple signals from selected ones of the subarrays 302a'-302c' to receiver channels 308a' and 308b'. Since there are only two receiver channels coupled to the output of switch 310' (i.e. channels 308a' and 308b') switch matrix 310' operates to couple two of the three subarrays to the two receiver channels (i.e. two subarrays are active) and the third subarray is inactive. In this illustrative embodiment, subarrays 302a' and 302b' are coupled to respective ones of receiver channels 308a', 308b' and subarray 308c' is made inactive by being coupled to a reference potential (here ground) through a matched termination 305.

Thus, with such a switch configuration, a first group of subarrays, here four subarrays 302a', 302b' 302d', 302e', may be coupled to the four receiver channels 308a'-308d' during a dwell. During a next dwell, switches may be reconfigured such that a second group of subarrays (for example subarrays 302a', 302c', 302d' and 302e') are coupled to the four receiver channels 308a'-308d'. This process may be repeated for as many different dwells as there are different groups (or combinations) of subarrays.

Although FIG. 3B illustrates switches in the first stage as three-throw switches having one input and three outputs and switches in the second stage as having three inputs and one output, it should be appreciated that switch matrix 310' may be designed using any of a variety of different types of multi-pole switches or multi-throw switches. A type of switched used may depend, at least in part, upon the needs of particular application and the components of the DF system 300' (e.g., number of array elements, number of receiver channels). Thus, in some applications, it may be possible or desirable or required to provide switch matrix from a single multi-pole, multi-throw switch. For example, switch matrix 310' may be provided as a two-pole, triple-throw switch (rather than being provided from a plurality of single-pole, triple-throw switches as illustrated in FIG. 3B).

Figure 4A:
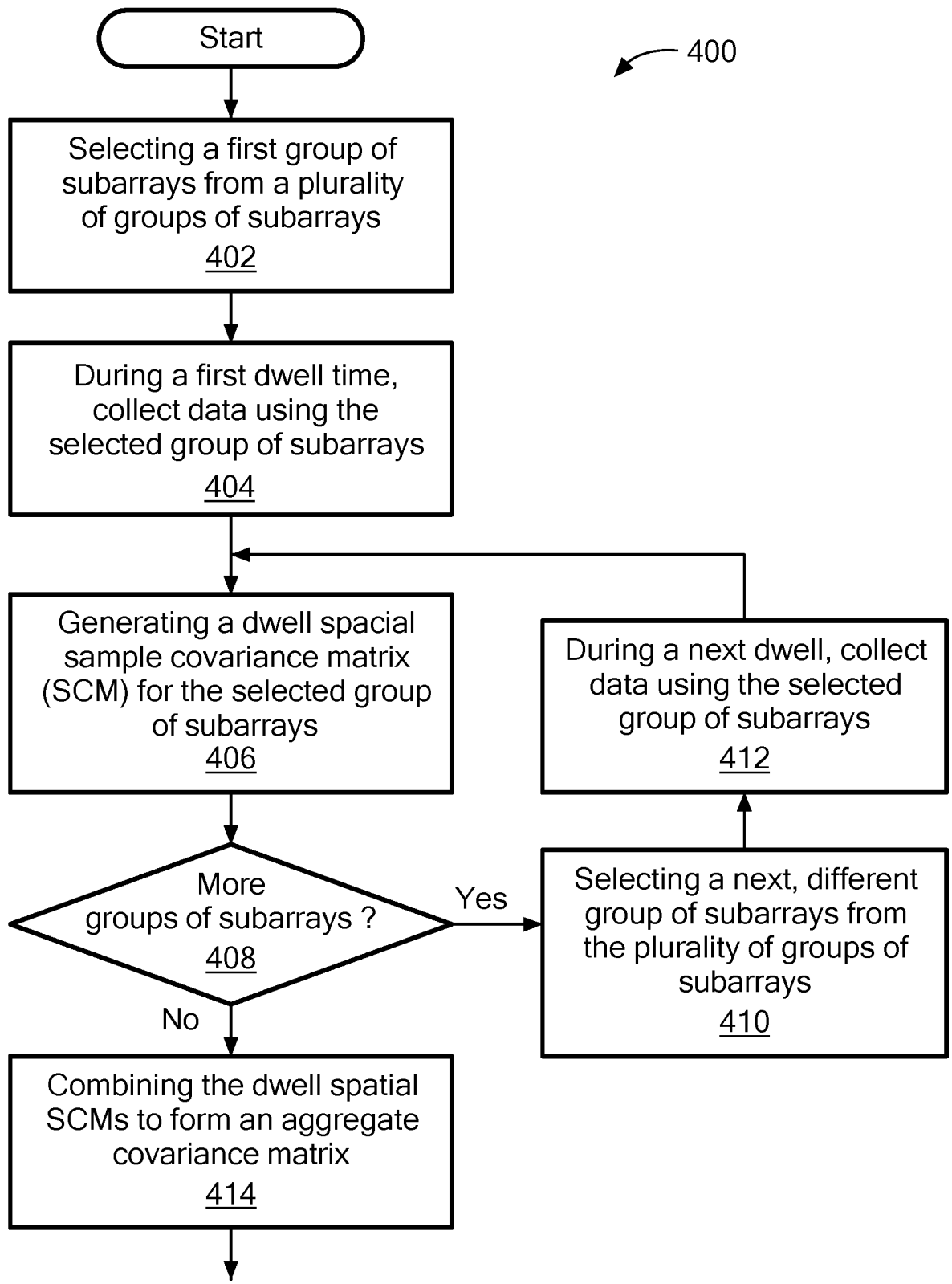
FIGS. 4A and 4B are flow diagrams of a method for performing direction finding using data from a plurality of different subarrays gathered at different dwell times.
Figure 4B:
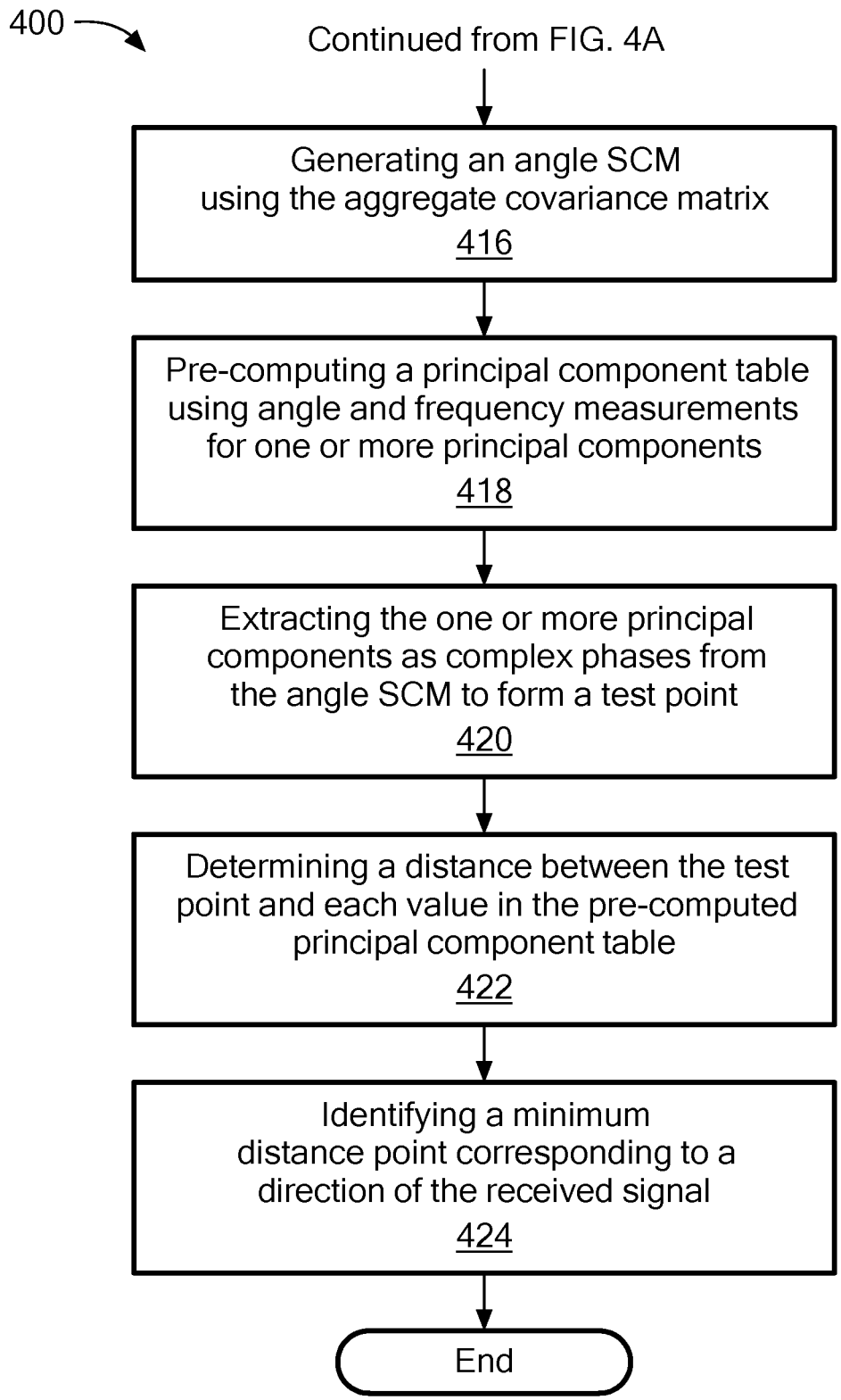

FIGS. 4A and 4B are a series of flow diagrams showing illustrative processing that can be implemented within a DF system such as DF system 100, or 300 or 300' described above in conjunction described above in conjunction with FIGS. 1, 3A, and 3B) and, more particularly, within a DF processor such as the DF processors 130 or 330 described above in conjunction with the illustrative systems of FIGS. 1, 3A, and 3B. In describing this processing, any of DF processors 130 or 330 may be referred to but it should be understood that reference to one does not limit the invention to that particular element. Rectangular elements (typified by element 402 in FIG. 4A), are denoted herein as "processing blocks," and represent computer software instructions or groups of instructions. Diamond shaped elements (typified by element 408 in FIG. 4A), are denoted herein as "decision blocks," and represent computer software instructions, or groups of instructions, which affect the execution of the computer software instructions represented by the processing blocks. Alternatively, the processing and decision blocks may represent steps or processes performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated, the particular sequence of blocks described is illustrative only and can be varied without departing from the spirit of the concepts, structures, and techniques described. Thus, unless otherwise stated the blocks described below are unordered meaning that, when possible, the functions represented by the blocks can be performed in any convenient or desirable order.

Turning now to FIGS. 4A and 4B, an illustrative method 400 for performing direction finding using a plurality of dwell spatial SCMs and an aggregate covariance matrix begins in processing block 402, in which a first group of subarrays from a plurality of groups of subarrays may be selected. RF signals may be received via the selected group of subarrays from one or a variety of different RF sources. For example, and as noted above, in some embodiments, the RF signals may correspond to a type of emergency beacon signal used in a variety of different applications, including but not limited to, airborne or ground-based search and rescue applications.

At processing block 404, during a first dwell time, data is collected via the selected first group of subarrays. That is, signals received by the first group of subarrays are concurrently coupled to a like number of receiver channels (i.e. one receiver channel for each active subarray) which process the signals and provide data from each subarray to a DF processor (e.g. DF processor 330 in FIG. 3B).

The data from a signal received via a subarray may be captured at an instantaneous point in time (e.g., a snapshot during each dwell time) or over a predetermined time period. Data is captured at a different one of a plurality of dwell times for each group of subarrays. Thus, each group of subarrays captures data at different dwell times (e.g., different snapshots). In some embodiments, the data may be captured at predetermined dwell times.

Processing proceeds to processing block 406 where the data may be represented as complex values (e.g., I/Q data) stored in a dwell spatial SCM for the first group of subarrays. The complex values may be representative of some, or all of an angle of arrival, amplitude, phase, and/or a polarization of the received signal. The data may be stored and further processed or analyzed in complex form.

In some embodiments, multiple samples may be taken of a single signal. In other embodiments, multiple samples may be taken of a plurality of different signals. In one embodiment, the data may correspond to different signals. It should be appreciated, that the number of data samples taken may vary depending upon a variety of factors, including but not limited to, a number of array elements, a number of subarrays used and the requirements of a particular application. In some embodiments, the number of data samples taken may be based, at least in part, upon a signal-to-noise ratio of the received RF signal. For example, for RF signals having a low signal-to-noise ratio it may be desirable to collect more data samples to increase an accuracy of the DF processing technique as compared to processing signals having a high signal to noise ratio.

At block 406, a dwell spatial SCM is generated using signals received during the first dwell by the first group of subarrays. The dwell SCM may be formed, for example, by a DF processor which may be the same as or similar to the DF processor 330 described in conjunction with FIGS. 3A and 3B. In one embodiment, the dwell SCMs may be formed by the SCM module 335 of DF processor 330. The dwell SCMs may include data sampled at antenna phase centers of array elements in a respective group of subarrays during the respective dwell time. The data may be compared to other data from the respective group of subarrays. In an embodiment, the size of the dwell SCM may correspond to the number of total groups of subarrays and thus include entries for both active array elements and inactive array elements. However, no data is received from the inactive subarrays and thus a value of zero is entered in the respective matrix entries for the inactive subarrays. A sample dwell SCM is provided below:

$$Sxx = \begin{bmatrix} S11 & S12 & S13 & \ldots & S1N \\ S21 & S22 & S23 & \ldots & S2N \\ S31 & S32 & S33 & \ldots & S3N \\ \vdots & \vdots & \vdots & \ddots & \vdots \\ SN1 & SN2 & SN3 & \ldots & SNN \end{bmatrix}$$

Where Sxy represents a comparison of a data sample taken at subarray x to a data sample taken at subarray y. In an embodiment, the sample dwell SCM may be the same as or substantially similar to Tables 1-3 described above in conjunction with FIGS. 3A and 3B. The dwell SCM the matrix values are complex values (e.g., an amplitude and phase which may be expressed as $A_1 \angle \theta_1$). In the dwell SCM above, values in a first column of the dwell SCM represent a difference between a sample of data taken at a first subarray to the samples taken at each of the other subarrays. Values along the main diagonal of the dwell SCM represent the difference between two data samples taken at the same subarray. Hence, the values of the main diagonal are ideally equal to zero. An $N^{th}$ column of the dwell SCM has values corresponding to the difference between a data sample taken at an $N^{th}$ subarray to the data sample taken at each of the other subarrays in the group of subarrays. Thus, it should be appreciated that the dwell SCM may typically include a number of rows and/or columns corresponding to the number of rows and/or columns in the group of subarrays. In some embodiments, the number of rows and/or columns in the dwell SCM may be based at least on the total number of subarrays in the group of subarrays (i.e. both active array elements and inactive elements).

At decision block 408, a decision is made as to whether data is to be collected through additional groups of subarrays. In an embodiment, the number of groups of subarrays used in a particular application can vary and may be based, at least in part, upon a total a number of elements in the array antenna, a number of receiver channels, a desired gain pattern of a DF system and/or a field of view of a DF system. As noted above, each different group of subarrays receives signals during a different dwell. Thus, decision block 408 and processing blocks 410, 412 implement a loop during which data is collected and an SCM is formed for each group of subarrays during the different dwells.

In an embodiment, method 400 may include a feedback mechanism to continually collect data from different groups of subarrays until a desired number of groups of subarrays have been sampled. For example, if the response to the decision block 408 is yes, then data is to be collected at more groups of subarrays and processing flows to processing block 410, to select a next, different group of subarrays from the plurality of subarrays with which to collect data.

Next, at processing block 412, during a next dwell time, data may be collected via the newly selected group of subarrays. Processing which occurs at processing block 412 may be the same as or substantially similar to processing which occurs at processing block 404, however the data collected is from a different group of subarrays at a different dwell time than in processing block 404.

Once data is collected in processing block 412, processing flows back to block 406 to generate a dwell spatial SCM for the most recently selected group of subarrays. Thus, method 400 may continually loop through blocks 406, 408, 410, 412 until the desired number of groups of subarrays have been sampled. Once, the predetermined number of groups of subarrays have been sampled, the response to decision block 408 is no and processing flows to processing block 414.

At processing block 414, the dwell SCMs corresponding to each of the groups of subarrays are combined to form an aggregate covariance matrix. In an embodiment, the SCM module 335 of DF processor 330 may combine each of the dwell SCMs to generate the aggregate covariance matrix. The dwell SCMs can be combined in complex form (e.g., quadrature space) to form the aggregate covariance matrix (i.e. the complex values in the dwell SCMs are combined in complex form to generate the aggregate covariance matrix). The aggregate covariance matrix may be the same as or substantially similar to aggregate covariance matrix described above in Table 4 in conjunction with FIGS. 3A and 3B.

In one embodiment, a MINDIST technique is applied to data stored in the aggregate covariance matrix. A MINDIST technique is described in detail in co-pending application Ser. No. 15/260,508, filed on even date herewith entitled "Systems And Methods For Direction Finding Based On Minimum Distance Search To Principal Components," which application is assigned to the assignee of the present application. In an embodiment, the MINDIST technique may include the processing illustrated in processing blocks 416-424.

In processing block 416, in accordance with a MINDIST technique, an angle SCM may be generated using the aggregate covariance matrix. The angle SCM may be generated based upon phase values of elements in the aggregate covariance matrix. In an embodiment, the angle SCM may be generated by the DF module 130 of FIG. 1 or the DF processor 330 of FIGS. 3A and 3B. For example, in one embodiment, the angle SCM may be formed by the SCM module 335 of DF processor 330. The angle SCM may be the same as or substantially similar to angle SCM provided in Table 5 described above with respect to FIGS. 3A and 3B.

In an embodiment, the angle SCM includes angle measurements for each entry in the aggregate covariance matrix. The angle SCM may represent angle measurements for the combination of array elements in each of the groups of subarrays sampled. The angle measurements may be used to determine or otherwise identify a phase difference between each of the entries in the aggregate covariance matrix or angle SCM. In an embodiment, the value of each entry in the angle SCM may represent a comparison of the data samples taken at the phase centers of each of the array elements used in the combination of subarrays. In some embodiments, an angle value of the entries represents a phase difference between the array elements represented by the combination of groups of subarrays. For example, an entry corresponding to a sample comparison between a first and second array element has an angle corresponding to the phase difference between the first and second array element. For example, one embodiment of an angle SCM is provided below:

$$\angle Sxy = \begin{bmatrix} 0 & -\Delta\Phi 12 & -\Delta\Phi 13 & \dots & -\Delta\Phi 1N \\ \Delta\Phi 21 & 0 & -\Delta\Phi 23 & \dots & -\Delta\Phi 2N \\ \Delta\Phi 31 & \Delta\Phi 31 & 0 & \dots & -\Delta\Phi 3N \\ \vdots & \vdots & \vdots & \ddots & \vdots \\ \Delta\Phi N1 & \Delta\Phi N2 & \Delta\Phi N3 & \dots & 0 \end{bmatrix}$$

Where ∠Sxx represents an angle defined by the comparison of a phase measurement at array element x to a phase measurement at array element y. Thus, ΔΦ21, corresponds to a phase difference between a first and a second element. In an embodiment, the angle SCM in Table 7 may be the same as or substantially similar to angle SCM provided in Table 5 described above with respect to FIGS. 3A and 3B.

Still referring to block 416, in an embodiment, each non-zero element of the angle SCM may be identified. In an embodiment, each non-zero element of the angle SCM may be identified by the DF module 130 of FIG. 1 or the DF processor 330 of FIGS. 3A and 3B. For example, in one embodiment, each non-zero element of the angle SCM may be identified by the SCM module 335 of DF processor 330.

Referring to the angle SCM above, it should be noted that the values along the main matrix diagonal correspond to a phase difference taken between the phase of a single subarray and thus are zero.

It should also be noted that the angle measurement between a first and second array element may be included twice in the table (e.g., in the first column, ΔΦ21, and in the second column, −ΔΦ12). That is, ΔΦmn=−ΔΦnm. As ΔΦmn=−ΔΦnm, there is some redundancy in some of the phase differences and thus only one of these values may be needed for computations. Therefore, in some embodiments, only a portion of the non-zero entries need be extracted from the angle SCM. Thus, a reduction in the number of array elements to be analyzed can be realized to reduce an overall computation time of the MINDIST technique by extracting only a portion of the non-zero entries from the angle SCM.

At block 418, a principal component table (p-table) may be computed using angle and frequency measurements for one or more principal components. In some embodiments, the p-table may be pre-computed. In an embodiment, the p-table may be generated by the DF module 130 of FIG. 1 or the DF processor 330 of FIGS. 3A and 3B. For example, in one embodiment, the p-table may be generated by the p-tables module 345 of DF processor 330.

In an embodiment, the frequency and angle components of the p-table may be precomputed in tables and can be extracted to the p-table. For example, the frequency and angle components can be pre-computed based on previously collected data and/or using estimated data. In an embodiment, the estimated data may be based on a known phase center location for a respective array element or data measured in a lab setting using, for example, a computer model of the array element (or array antenna). In some embodiments, the frequency and angle components may be computed prior to the one or more array elements receiving a signal or prior to a sample of data being taken at the respective array elements. Thus, the frequency and angle components may be extracted from the precomputed tables during execution of the MINDIST technique. In an embodiment, the tables may be look-up tables (or indexes) and the corresponding vector data may be extracted after the principal components have been identified.

In other embodiments, the frequency and angle components may be computed simultaneously or substantially simultaneously as the one or more array elements receiving signals or samples of data being taken at one or more of the array elements.

In an embodiment, the frequency and angle components may be computed for a desired range. For example, a table may be generated by performing a principal components analysis for all angles within a desired range relative to predetermined azimuth range and a predetermined elevation range. For example, and referring to equation 1 below:

$$\forall (\theta, \varphi) \in \left[-\frac{\pi}{2}, \frac{\pi}{2}\right] \times \left[-\frac{\pi}{2}, \frac{\pi}{2}\right] \qquad \text{Eq. 1}$$

As illustrated in Eq. 1, using a range defined by the azimuth range of $$\left[-\frac{\pi}{2}, \frac{\pi}{2}\right]$$

and the elevation range of $$\left[-\frac{\pi}{2}, \frac{\pi}{2}\right],$$

frequency and angle components may be computed using an array manifold vector. In an embodiment, the array manifold vector corresponds to the array of array elements being analyzed. Thus, the array manifold vector $\bar{v}(f, \theta, \varphi)$, may be represented by equation 2 below:

$$\bar{v}(f, \theta, \varphi) = \left[ e^{j\frac{2\pi f}{c_{light}} P_{el1}^T \bar{u}(\theta,\varphi)}, e^{j\frac{2\pi f}{c_{light}} P_{el2}^T \bar{u}(\theta,\varphi)} \dots e^{j\frac{2\pi f}{c_{light}} P_{elk}^T \bar{u}(\theta,\varphi)} \right]^T \qquad \text{Eq. 2}$$

in which:
$C_{light}$=speed of light
P=Element position
T=vector Transpose operator
el, =the element index
$\bar{u}$=normalized line of sight direction vector as a function of (θ, ϕ)

θ=azimuth angle
φ=elevation angle

The frequency and angle components may be computed for each of the array elements over a desired frequency range using the array manifold vector. In an embodiment, vector data may be generated for each of the array elements. In an embodiment, the vector data may be generated by the DF module 130 of FIG. 1 or the DF processor 330 of FIGS. 3A and 3B. For example, in one embodiment, the vector data may be generated by the p-tables module 345 of DF processor 330.

In an embodiment, a vector data table may be generated by comparing the vector data from each of the array elements. For example, one embodiment of a vector data table is illustrated below:

$$S_{VV} = \begin{bmatrix} v_1 v_1^* & v_1 v_2^* & v_1 v_3^* & \ldots & v_1 v_N^* \\ v_2 v_1^* & v_2 v_2^* & v_2 v_3^* & \ldots & v_2 v_N^* \\ v_3 v_1^* & v_3 v_2^* & v_3 v_3^* & \ldots & v_3 v_N^* \\ \vdots & \vdots & \vdots & \ddots & \vdots \\ v_N v_1^* & v_N v_2^* & v_N v_3^* & \ldots & v_N v_N^* \end{bmatrix}$$

Where $v_x$ represents the vector data for array element x and $v_x^*$ represents the complex conjugate of the vector data for array element x (i.e., $v_2 v_1^* = \Delta\Phi_{21}(f, \theta, \varphi)$). In an embodiment, to generate the vector data table, the resulting vector data for each array element may be multiplied by its complex conjugate and/or the complex conjugate of vector data from another array element.

In some embodiments, the vector data table can be precomputed and thus used as a look-up table to pull specific entries corresponding to an extracted principal component. In an embodiment, the angle SCM (Table 7) may be used to identify the appropriate entries in the vector data table (Table 8) to be extracted. For example, the non-zero elements in the angle SCM correspond to the extracted principal components and in some embodiments, the entries in the vector table data corresponding to the extracted principal components may be extracted to generate a p-table. Thus, the number of entries in the p-table may correspond to the number of extracted principal components (e.g., 1 entry per each extracted principal component) and the extracted entries from the vector data table.

The p-table may sort each of the SCM elements having a non-zero angle by their respective vector data (e.g., by frequency and angle data). Thus, a final p-table may include the extracted principal component data sorted by frequency and angle. One embodiment of a p-table is provided in Table 9 below:

$$\overline{p}(f, \theta, \varphi) = \begin{bmatrix} \Delta\Phi_{21}(f, \theta, \varphi) \\ \Delta\Phi_{31}(f, \theta, \varphi) \\ \vdots \\ \Delta\Phi_{M1}(f, \theta, \varphi) \end{bmatrix}$$

Where $\Delta\Phi_{xy}(f, \theta, \varphi)$ represents the vector data for an SCM element comparing array element x to array element y. For example, $\Delta\Phi_{xy}$ represents a principal component angle value for SCM element comparing an X array element and a Y array element, f represents frequency, θ represents a first angle value (e.g., azimuth angle) and φ represents a second angle value (e.g., elevation angle). M represents the number of entries in the p-table, which as indicated above, may correspond to the number of extracted principal components and the extracted entries from the vector data table. The p-table may include all of the vector data for each of the extracted principal components.

In some embodiments, the number and/or size (i.e., number of entries in the p-table) of p-tables generated may vary according to a particular application of the MINDIST technique. For example, in some embodiments, the p-table may be generated for a desired angular field of view (e.g., ±M° az, ±Nσ el). Thus, the number of entries in the p-table can vary according to the desired angular field of view. Further, the number of entries in the p-table may correspond to the number of array elements in an antenna array and/or the number of principal components extracted from an SCM. For example, in some embodiments, for a K array element array, $$K' = \frac{(K^2 - K)}{2}$$

values or entries may be extracted from an SCM, where K' represents the number of principal components to be used (e.g., principal components to be extracted) for a particular application of the MINDIST technique.

In some embodiments, a p-table may be broken up into N different (θ, φ) subspaces. Each of the subspaces may be processed independent of each other or two or more of the N different (θ, φ) subspaces may be processed together. In an embodiment, each of the N different (θ, φ) subspaces may be processed on different systems (e.g., N different processors), and may be processed in simultaneously or substantially simultaneously. Thus, the computation time may be reduced by 1/N. The results from each system, each of the N different processors, may be compared to identify a minimum distance point.

In some embodiments, the one or more tables (e.g., non-zero SCM element table, vector data table) may be computed prior to one or more array elements receiving a signal and/or a sample of data being taken of a signal received at one or more array elements. For example, the tables may be pre-computed using previously collected data for an array and/or estimated data for an array (e.g., estimated snapshots at one or more array elements). In other embodiments, tables (e.g., non-zero SCM element table, vector data table) may be generated simultaneously to one or more array elements receiving a signal and/or a sample of data being taken of a signal received at one or more array elements.

At block 420, principal components may be extracted from the aggregated covariance matrix or the angle SCM to form a test point. In an embodiment, the principal components may be extracted by the DF module 130 of FIG. 1 or the DF processor 330 of FIGS. 3A and 3B. For example, in one embodiment, the principal components may be extracted by the principal components module 340 of DF processor 330.

In an embodiment, the principal components in the p-table may correspond to desired values from the aggregate covariance matrix or the angle SCM. The principal components may be sorted in the p-table by their respective frequency, angle and/or phase components. Thus, the corresponding principal components can be identified in the aggregate covariance matrix or the angle SCM using their respective angle and frequency measurements.

In an embodiment, the principal components may correspond to entries in the angle SCM having a non-zero angle. For example, and referring back to Table 7, phase difference measurements that are greater than or less than zero (i.e., not equal to zero) may be identified in the angle SCM. The phase difference measurements that are greater than or less than zero may be extracted from the angle SCM and represent principal components.

In one embodiment, one-half of the non-zero entries may be extracted from the angle SCM. In other embodiments, the number of principal components extracted may vary depending upon a variety of factors including, but not limited to a frequency of the signal(s) being analyzed. For example, in one embodiment, as the frequency increases, the variance (e.g., power) may be distributed across the principal components. In some embodiments, a signal having a frequency can have a smaller wavelength and therefore more information may be contained in more of the antenna phase centers. Alternatively, in other embodiments, a signal having a lower frequency may have a longer wavelengths and fewer phase centers may be needed to perform the MINDIST technique. Thus, more principal components may be needed to compute a minimum distance point at a higher frequency than at a lower frequency.

At block 422, a distance may be determined between a test point and each value in the principal component table. In an embodiment, the distance measurement may be determined by the DF module 130 of FIG. 1 or the DF processor 330 of FIGS. 3A and 3B. For example, in one embodiment, the distance measurement may be determined by the distance measurement module 350 of DF processor 330.

The test point may refer to data collected (e.g., data snapshot) taken during an operation of a DF system (e.g., radar system, antenna system). The test point can be selected from the real-time data collected from the snapshots at one or more of array elements 102a-102n of FIG. 1, one or more of the array elements 302a-302N of FIG. 3A, and/or 302a'-302e' of FIG. 3B. For example, the test point may be formed by extracting principal components as complex phases from the aggregate covariance matrix or the angle SCM generated by SCM module 335. Thus, the test point may correspond to data currently received from array elements 302a-302N.

In some embodiments, multiple test points may be used. The data from the test point may be measured against the values in the p-table to identify a minimum distance point (or a closest entry in the p-table to the test point collected). In some embodiments, multiple test points may be used. For example, in one embodiment, a distance may be calculated between each test point and each entry in the p-table. In an embodiment, a test point may be arbitrarily chosen from a plurality of snapshots (e.g., real time data points) collected during operation. In other embodiments, the test point may be predetermined.

In an embodiment, for each of the entries (values) in the p-tables, a distance may be calculated from the respective entry to the test point. In some embodiments, a distance metric may be selected to perform the calculation. For example, and without limitation, a Mahalanbois distance (equation 3 below) or a Euclidean distance (equation 4 below) to perform the calculation.

$$D_{mahal} = \sqrt{(\bar{x}-\bar{p})^T S^{-1}(\bar{x}-\bar{p})} \qquad \text{Eq. 3}$$

$$D_{seuc} = \sqrt{(\bar{x}-\bar{p})^T \left[\begin{pmatrix} \frac{1}{\sigma_1^2} & \cdots & 0 \\ \vdots & \ddots & \vdots \\ 0 & \cdots & \frac{1}{\sigma_N^2} \end{pmatrix}\right](\bar{x}-\bar{p})} \qquad \text{Eq. 4}$$

where $\bar{x}$ represents the Xth p-table entry data and $\bar{p}$ represents the test point data. In an embodiment in which the Euclidean distance is used, an inverse covariance matrix may be formed from the distribution of data points in the p-table for each principal component. The inverse covariance matrix can be applied in the distance measurement to compute the Euclidean distance between the test point and each of the p-table entries. In an embodiment, the inverse covariance matrix may be precomputed and applied to the p-table entries in order to reduce a computation time of the MINDIST technique.

At block 424, a minimum distance point corresponding to a direction of the received signal may be identified. In an embodiment, the minimum distance point may be determined by the DF module 130 of FIG. 1 or the DF processor 330 of FIGS. 3A and 3B. For example, in one embodiment, the minimum distance point may be determined by the minimum distance module 355 of DF processor 330.

In an embodiment, each of the measured distances for each of the entries in the p-table may be compared to identify a minimum distance point. For example, in one embodiment, equation 5, as provided below, may be used to solve for the minimum distance point.

$$(\hat{\theta},\hat{\varphi}) = \arg_{(\theta,\varphi)} \min D(\theta,\varphi) \qquad \text{Eq. 5}$$

A point having the minimum distance to the test point, as compared with the other entries in the p-table may be identified. The value may be a minimum distance point representative of an angle of arrival of a signal on the one or more array elements.

In some embodiments, an estimation of the expected minimum point for a specific frequency may be generated. For example, in some embodiments, an expected minimum point may be estimated using previously collected data and/or estimations of array properties. Each of the entries in the p-table may be compared to the estimation to identify the entry in the p-table that is closest the estimation for the frequency.

In an embodiment, an output signal may be generated indicating the minimum distance point, such as a DF output signal. In an embodiment, the output signal may be generated by the DF module 130 of FIG. 1 or the DF processor 330 of FIGS. 3A and 3B. The DF output signal may be an estimated angle of arrival of a signal incident one or more of the array elements. In some embodiments, the estimated angle of arrival of the signal may be a two-dimensional (2D) estimation.

Figure 5:
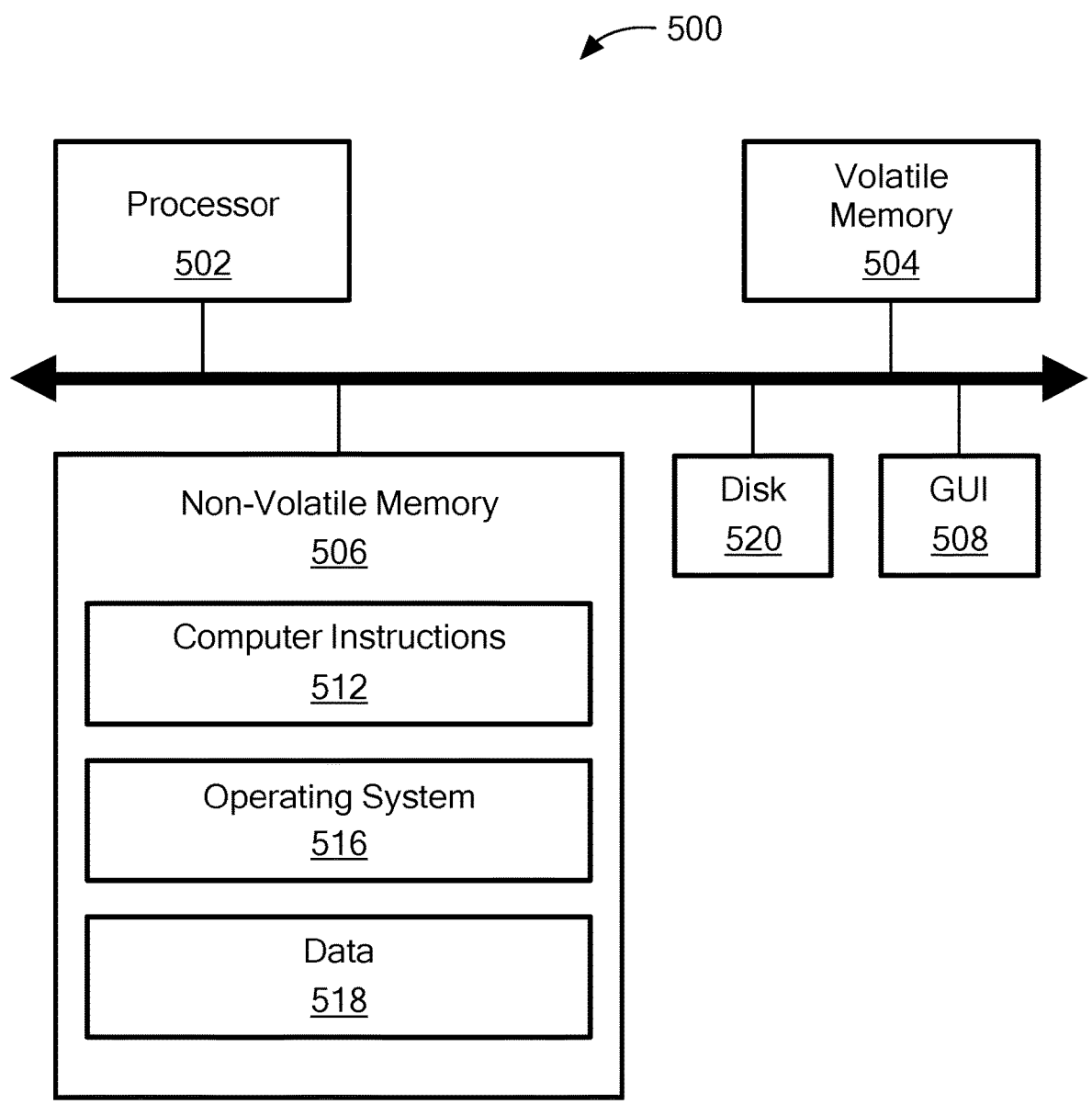
FIG. 5 is a block diagram of an embodiment of a processing system for performing DF processing in accordance with the techniques described herein.

Referring now to FIG. 5, a computer 500 includes a processor 502, a volatile memory 504, a non-volatile memory 506 (e.g., hard disk), a graphical user interface (GUI) 508 (e.g., a mouse, a keyboard, a display, for example) and a computer disk 520. The non-volatile memory 506 stores computer instructions 512, an operating system 516 and data 518. In an embodiment, the data 518 may include data collected corresponding to signals received at one or more array elements. The data may include complex I/Q data representing the signal. For example, in some embodiments, the data may include complex voltage signals representative of angle, amplitude, phase, and/or a polarization of the signal. In embodiment, the data may include an angle measurement of the signal relative to the phase center of the respective array element that received the signal. In an embodiment, the data may be a snapshot of the signal at a predetermined period of time or over a predetermined time period.

In some embodiments, non-volatile memory 506 includes a look-up table that stores and organizes data corresponding to the data collected, as well as any tables (e.g., p-tables, dwell SCMs, aggregate SCM, angle SCM, SCM phase different matrices, vector data tables) or matrices generated using the samples of data. In one example, the computer instructions 512 are executed by the processor 502 out of volatile memory 504 to perform all or part of the method (or process) 400 of FIGS. 4A and 4B.

In an embodiment, computer 500 may be the same as or substantially similar to each of the components of the DF module 130 and/or DF processor 330, for example, the spatial SCM module 335, principal components module 340, distance measurement module 350, minimum distance module 355 and p-table module 345. Computer 500 may perform all of the same functions and be configured to receive and generate the same data as each of the components of the DF module 130 and/or DF processor 330 as described herein, such as the spatial sample covariance matrix (SCM) module 335, principal components module 340, distance measurement module 350, minimum distance module 355 and p-table module 345. For example, computer 500 may be configured to perform real time direction finding determinations, capture data corresponding to signals incident on or one or more array elements and generate tables and/or matrices (e.g., p-tables, dwell SCMs, aggregate SCM, angle SCM, SCM phase different matrices, vector data tables) to identify a direction of arrival of a signal.

Method 400 is not limited to use with the hardware and software of FIG. 5; they may find applicability in any computing or processing environment and with any type of machine or set of machines that is capable of running a computer program. Method 400 may be implemented in hardware, software, or a combination of the two. Method 400 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform method 400 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. Alternatively, the system may be implemented, at least in part, as firmware.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform method 400. Method 400 may also be implemented as a machine-readable storage medium, configured with a computer program, where upon execution, instructions in the computer program cause the computer to operate in accordance with method 400.

Method 400 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed is:

1. A system comprising:
   a plurality of subarrays, each of the subarrays having an output port;
   a radio frequency (RF) receiver having one or more receiver channels, wherein the number of subarrays is greater than the number receiver channels; and
   a switch network having a plurality of input ports with each input port coupled to an output of one or more respective ones of said plurality of subarrays and having output ports with each switch output coupled to an input of respective one of the one or more receiver channels, said switch network operable to switch between different groups of subarrays at different dwell times such that at least one group of subarrays is configured to provide signals to the receiver channels;
   a direction finding processor coupled to receive signals from said RF receiver during a selected one of a plurality of dwell times.

2. The system of claim 1, wherein said receiver is configured to simultaneously provide signals to said DF processor of subarrays is active and at least one array element in each of the groups of subarrays is inactive.

3. The system of claim 1, wherein the switch matrix comprises a plurality of stages and each of the plurality of stages includes two or more switches.

4. The system of claim 1, wherein each of the plurality of subarrays is coupled to an input of said switch network.

5. The system of claim 1, wherein at least one subarray of the group of subarrays is coupled directly to a receiver channel.

6. The system of claim 1, wherein each of the plurality of subarrays comprise one or more antenna elements coupled directly to the direction finding module.

7. The system of claim 1, wherein the direction finding module comprises:
   a spatial sample covariance matrix (SCM) module to receive the data and generate one or more dwell spatial sample covariance matrices (SCMs) and an aggregate covariance matrix using the data;
   a p-table module to generate a table having components as a function of frequency and angle measurements;
   a principal component module coupled to the SCM module and the p-table module, wherein the principal component module generates a principal component table having one or more principal components sorted by the frequency and angle measurements;

a distance measurement module coupled to the principal component module, wherein the distance measurement module calculates a distance from a test point to each entry in the principal component table; and a minimum distance module coupled to the distance measurement module, wherein the minimum distance measurement module determines a minimum distance point based on the calculated distances from the test point to each entry in the principal component table.

8. The system of claim 1, wherein the switch network is further configured to select groups of subarrays from among the plurality of groups of subarrays with which to receive signals.

9. The system of claim 1, wherein each of the selected groups of subarrays are configured to receive signals during a corresponding one of a plurality of dwell times.

10. The system of claim 1, wherein at each of the plurality of dwell times, the switch network is further configured to simultaneously couple respective ones of a selected group of subarrays to respective ones of the one or more receiver channels.

11. The system of claim 7, wherein the SCM module generates the aggregate covariance matrix by combining the one or more dwell spatial SCMs in complex form.

12. The system of claim 11, wherein the minimum distance module is further configured to use values from the aggregate covariance matrix to generate a DF output signal indicative of a direction of a signal received by at least some of the selected groups of subarrays.

13. The system of claim 12, wherein the principal component module is configured to use values from the aggregate covariance matrix to pre-compute the principal component table.

14. The system of claim 13, wherein the distance measurement module is configured to form the test point by extracting the one or more principal components as complex phases from the aggregate covariance matrix.

15. The system of claim 14, wherein the minimum distance point corresponds to a direction of the received signals.

16. The system of claim 15, wherein the p-table module is configured to determine vector data for each of the plurality of array elements, wherein the vector data includes an angle and a frequency measurement.

17. The system of claim 16, wherein the p-table module is configured to identify a phase difference between each of the elements in the aggregated covariance matrix using angle measurements.

* * * * *